US008301693B2

(12) United States Patent
Finley et al.

(10) Patent No.: US 8,301,693 B2
(45) Date of Patent: Oct. 30, 2012

(54) CONTENT MANAGEMENT

(75) Inventors: Timothy J. Finley, Cambridge, MA (US); Michael W. Sorenson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/624,499

(22) Filed: Nov. 24, 2009

(65) Prior Publication Data

US 2011/0125829 A1 May 26, 2011

(51) Int. Cl.
*G06F 15/16* (2006.01)
(52) U.S. Cl. ......... 709/203; 709/202; 709/229; 709/230
(58) Field of Classification Search .......... 709/202–203, 709/229–230
See application file for complete search history.

(56) References Cited

U.S. PATENT DOCUMENTS

| 6,583,798 | B1 | 6/2003 | Hoek et al. | |
|---|---|---|---|---|
| 7,058,895 | B2 | 6/2006 | Kautto-Koivula et al. | |
| 7,137,069 | B2 | 11/2006 | Abbott et al. | |
| 2006/0089983 | A1* | 4/2006 | Piersol | 709/223 |
| 2007/0198944 | A1 | 8/2007 | Viswanathan et al. | |
| 2008/0010337 | A1* | 1/2008 | Hayes et al. | 709/202 |
| 2008/0092054 | A1* | 4/2008 | Bhumkar et al. | 715/739 |
| 2008/0126476 | A1* | 5/2008 | Nicholas et al. | 709/203 |
| 2009/0276771 | A1* | 11/2009 | Nickolov et al. | 717/177 |

OTHER PUBLICATIONS

William R. Hazelwood et al., Exploring Evaluation Methods for Ambient Information Systems, CHI 2008 Proceedings—Works in Progress, pp. 2973-2978, Apr. 5-10, 2008, Florence, Italy.

Peter Hutterer et al., Lightweight User Interfaces for Watch Based Displays, 6th Australasian User Interface Conference, 2005, Newcastle.

Sudarshan Murthy et al., Putting Integrated Information in Context: Superimposing Conceptual Models with Sparce, 1st Asia-Pacific Conference on Conceptual Modeling, pp. 71-80, Australian Computer Society, Inc. 2004. Dunedin, New Zealand.

Ke-Thia Yao et al., Asynchronous Information Space Analysis Architechture Using Content and Structure-Based Service Brokering, Digital Libraries, pp. 133-142, 2000, San Antonio, TX.

* cited by examiner

*Primary Examiner* — Wing Chan
*Assistant Examiner* — Benjamin M Thieu
(74) *Attorney, Agent, or Firm* — Cantor Colburn LLP; Louis Percello

(57) ABSTRACT

A method, system, and computer program product for providing content management services are provided. The method includes displaying a listing of content feeds within a user interface screen, each content feed representing a list of content entries. The method also includes receiving preferences via a user interface. The preferences include: a weighting factor representing a relevance of content sources for each of the content feeds in context with others of the content feeds in the listing; and a view type selected from a list of view types to each of the content feeds in the listing, each of the view types representing a manner in which information in the content feeds is displayed via the user interface. The method further includes applying the preferences to the content feeds and displaying results of the preferences via the user interface screen. The results represent a modified form of a selected content feed.

22 Claims, 22 Drawing Sheets

CONTENT MANAGEMENT

BACKGROUND

Embodiments of the invention relate generally to content management, and more particularly, to a method, system, and computer program product for managing content through a configurable interface.

The Internet has offered consumers and organizations the benefit of easy access to information. In a business context, this information can be an organization's main source of competitive advantage (e.g., it may enable a company to find an opportunity, identify and correct a liability, or provide input to the kind of synthesis that moves it forward). Currently, the sources and range of information available are expanding exponentially. Examples of information sources include instant messaging, social networking, news aggregators, wikis, and other collaborative applications. Ironically, however, this increasing volume of information has a parallel trend in obscurity of information. The more information there is available, the harder it becomes to manage the information and focus on the sources and subjects that are relevant.

Existing feed readers (also referred to as "news aggregators") attempt to solve the problem of managing information from multiple sources by bringing much of the information into one place. Instead of visiting each information source for content, the content is delivered to the recipient. Although aggregation of information from various sources is helpful, it would not solve the problem of information overload. Some feed readers enable the ability to tailor the information in various textual formats, such as displaying a preview page, displaying full content, displaying content summaries or headlines, or labeling/coloring information from specified people or sources. However, these customization options are limited in that they present the incoming information as a textual list. While textual listings may be beneficial in some cases, such as when a user desires to review each item in the list, this form of presentation may not be suitable for all types of content.

Another drawback with existing feed readers is that they do not give users an easy way to separate and focus on the important information sources. While some feed readers offer the ability to group information sources in folders, this option can become a cumbersome task where a user desires to track feeds based upon a relevance of the information to the user, especially when the importance changes on a daily basis.

It would be desirable to provide a flexible user interface that allows contextual customization of how the user views information from various sources.

SUMMARY

Exemplary embodiments relate to a method, system, and computer program product for providing content management services. The method includes displaying a listing of content feeds within a user interface screen, each content feed representing a list of content entries. The method also includes receiving preferences via a user interface. The preferences include: a weighting factor representing a relevance of content sources for each of the content feeds in context with others of the content feeds in the listing; and a view type selected from a list of view types to each of the content feeds in the listing, each of the view types representing a manner in which information in the content feeds is displayed via the user interface. The method further includes applying the preferences to the content feeds and displaying results of the preferences via the user interface screen. The results represent a modified form of a selected content feed.

The system includes a host system executing a content management application including a user interface. The content management application implements a method. The method includes displaying a listing of content feeds within a user interface screen, each content feed representing a list of content entries. The method also includes receiving preferences via the user interface. The preferences include: a weighting factor representing a relevance of content sources for each of the content feeds in context with others of the content feeds in the listing; and a view type selected from a list of view types to each of the content feeds in the listing, each of the view types representing a manner in which information in the content feeds is displayed via the user interface. The method further includes applying the preferences to the content feeds and displaying results of the preferences via the user interface screen. The results represent a modified form of a selected content feed.

The computer program product includes a storage medium encoded with machine-readable program code for providing content management services. The program code includes instructions for causing a processor to implement a method. The method includes displaying a listing of content feeds within a user interface screen, each content feed representing a list of content entries. The method also includes receiving preferences via a user interface. The preferences include: a weighting factor representing a relevance of content sources for each of the content feeds in context with others of the content feeds in the listing; and a view type selected from a list of view types to each of the content feeds in the listing, each of the view types representing a manner in which information in the content feeds is displayed via the user interface. The method further includes applying the preferences to the content feeds and displaying results of the preferences via the user interface screen. The results represent a modified form of a selected content feed.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION OF EXEMPLARY EMBODIMENTS

In accordance with exemplary embodiments, content management services are provided. The content management services offer a flexible user interface that allows a user to contextually customize how the information from sources are viewed. Additionally, the content management system also provide the ability contextually specify the importance of various sources of information. The information sources may be customized to provide a visual representation of the content, render additional context along with the content, and/or abstract the content away, thereby providing the user with many different ways to look at one information source. For example, using a selected interface for an individual source of information may help the user better understand and more aptly react to incoming content, thus assisting the user in better managing the volume of content received by the user.

Feeds of content provided by content sources may be implemented using standard formatting and communication protocols, e.g., Rich Site Summary or RDF Site Summary (RSS) developed by Netscape®, Atom, or Outline Processor Markup Language (OPML). RSS and Atom are standardized, XML-based formats that encapsulate headlines, URLs, and summaries (among other information depending upon the format) of a group of links. An RSS file is a feed that syndicates (e.g., makes available) the content for other sites or applications to use. Atom encapsulates a variety of different data formats such as MP3s and video. OPML enables publishers of data to provide listings and directories of their new feeds.

Figure 1:
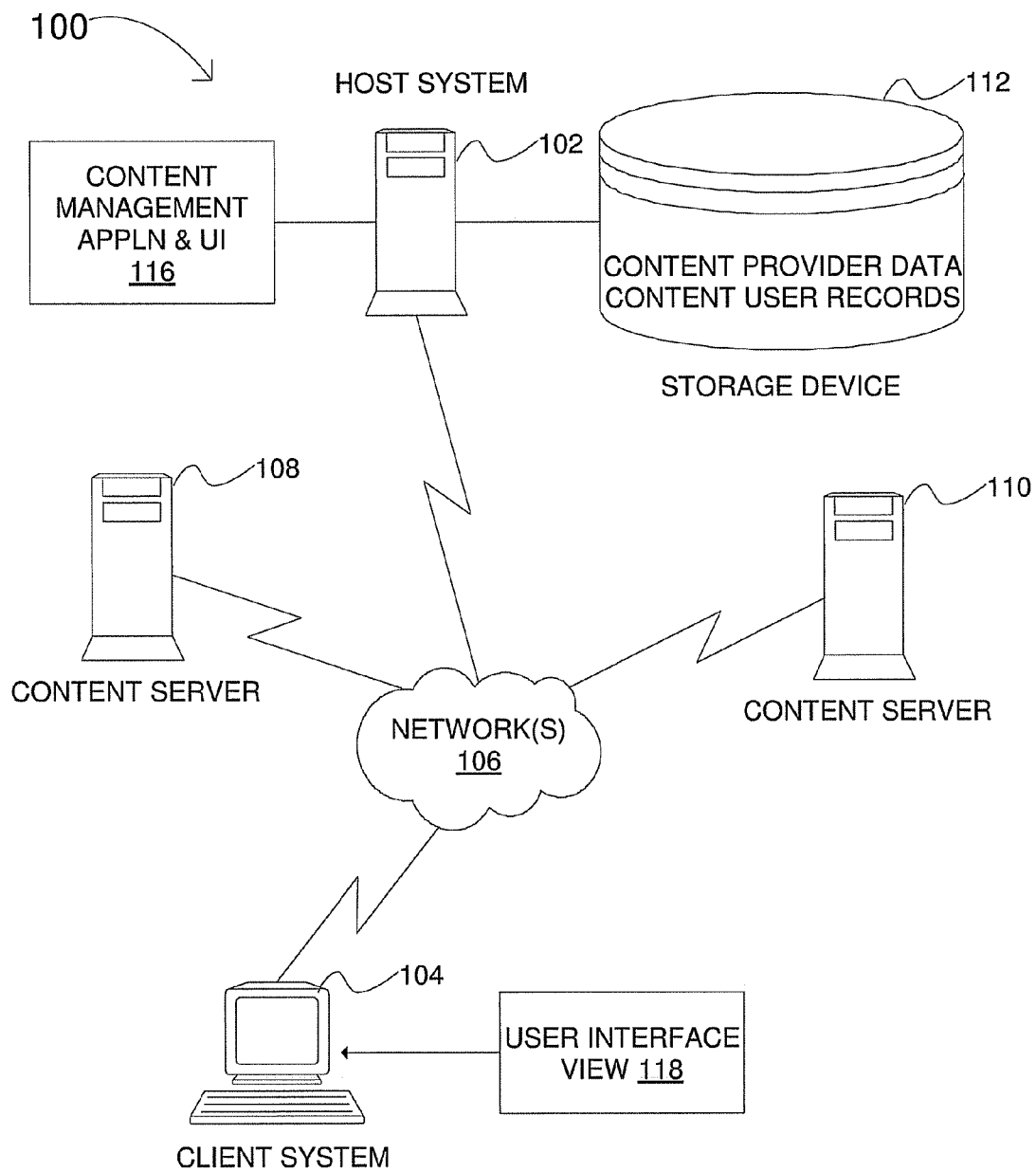
FIG. 1 is a block diagram of a system upon which content management services may be implemented in exemplary embodiments.

Turning now to FIG. 1, a block diagram of a system upon which the content management services may be implemented in exemplary embodiments will now be described. The system of FIG. 1 includes a host system 102 in communication with a client system 104 and two content servers 108 and 110 via a network 106. Host system 102 may be implemented using one or more servers operating in response to a computer program stored in a storage medium accessible by the server(s). The host system 102 may operate as a network server (e.g., a web server) to communicate with one or more client systems, e.g., client system 104. The host system 102 may handle sending and receiving information to and from client systems 104A and may perform associated tasks.

The host system 102 may also operate as an application server. In accordance with exemplary embodiments, the host system 102 executes one or more computer programs to provide content management services. These one or more computer programs are referred to collectively herein as a content management application 116. Alternatively, a portion of the functionality of the content management application 116 may be implemented via the client system 104.

Content management activities may be shared by the client system 104 and the host system 102 by providing an application (e.g., java applet) to the client system 104. Alternatively, client system 104 may include stand-alone software applications for performing a portion of the processing described herein. In yet further embodiments, the content management system functions may be built in to a web browser application executing on the client system 104 (not shown). As previously described, it is understood that separate servers may be utilized to implement the network server functions and the application server functions of host system 102. Alternatively, the network server and the application server may be implemented by a single server executing computer programs to perform the requisite functions described with respect to host system 102.

Client system 104 may be coupled to host system 102 via network 106. The client system 104 may be implemented using a general-purpose computer executing a computer program for carrying out some of the processes described herein. The client system 104 may be a personal computer (e.g., a laptop, a personal digital assistant) or host-attached terminal.

For purposes of illustration, client system 104 is operated by a consumer of Internet services including web services. Client system 104 includes a web browser application for performing web activities. The content management system application 116 may provide a user of client system 104 with a user interface for facilitating the content management activities described herein.

In exemplary embodiments, the content management system shown in FIG. 1 includes a storage device 112. Storage device 112 is in communication with host system 102 and may be implemented using a variety of devices for storing electronic information. It is understood that the storage device 112 may be implemented using memory contained in the host system 102 or it may be a separate physical device. The storage device 112 is logically addressable as a consolidated data source across a distributed environment that includes network 106. Information stored in the storage device 112 may be retrieved and manipulated via the host system 102 and authorized users of client system 104. The storage device 112 houses content provider data (e.g., information relating to the content sources, such as content servers 108 and 110), content user records, (e.g., information relating to users of client systems, such as client system 104 who subscribe to various content sources for receiving content), and other information desired by the service provider of host system 102. The content user records identify content sources from which they receive content. The content user records may also store customer preferences for determining how various feeds of content are to be displayed to the user. These features are described further herein. In an exemplary embodiment, the host system 102 operates as a database server and coordinates access to application data including data stored on storage device 112.

Content servers 108 and 110 refer to data sources accessed by one or more users of client system 104 and host system 102. Content servers 108 and 110 provide feeds of information such as news articles, white papers, public service data, weblogs, and other similar types of information. For example, content server 108 may be operated by a news organization or web portal enterprise.

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. Client systems 104 may be coupled to the host system 102 through multiple networks (e.g., intranet and Internet) so that not all client systems are coupled to the host system 102 through the same network. One or more of the client systems and the host system 102 may be connected to the network 106 in a wireless fashion.

As indicated above, the content management system may be implemented via a separate application 116 or may be built into one or more existing applications (e.g., a collaborative application or service implemented through Web 2.0). The flow diagram of FIG. 2 describes an exemplary process for implementing the content management services. It is assumed for purposes of illustration, that the content management services are provided via a web service provider system. It is also assumed that users (client system 104) are registered with host system 102 for these services and corresponding content user records are maintained in storage device 112. It is further assumed that a user of client system 104 has selected information sources (e.g., content server 108/110) to receive content feeds. The information sources may be acquired and selected during the course of conducting activities over the Web (e.g., searching, browsing, accessing websites such as content servers 108 and 110, etc.). This activity can be persistent (as in a user's Bookmarks in Internet Explorer®) or it can be transient (as in a Google® search based upon keywords).

Figure 2:
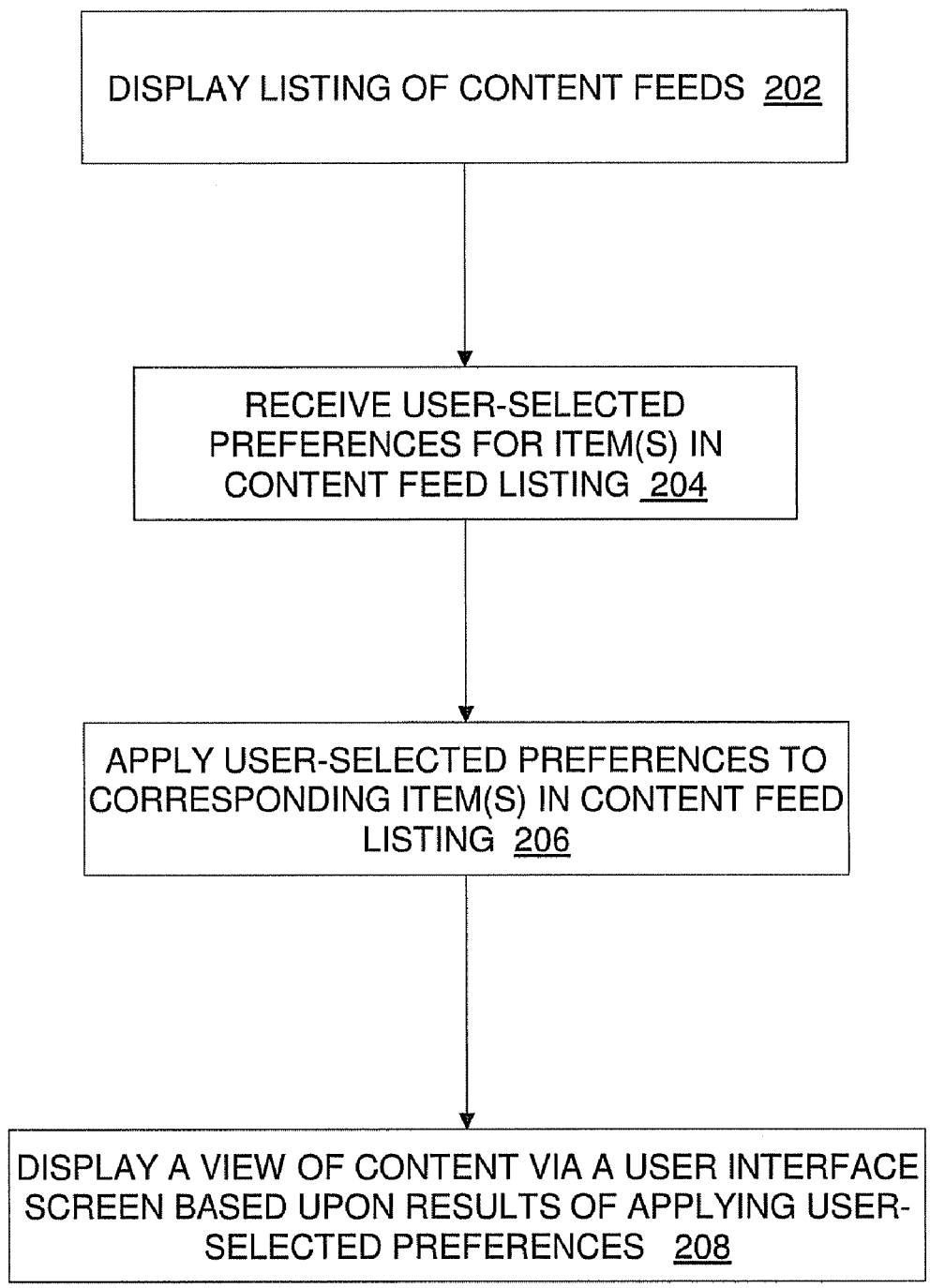
FIG. 2 is a flow diagram of a process for implementing the content management services in exemplary embodiments.

Turning now to FIG. 2, a flow diagram of a process for implementing the content management system will now be described in an exemplary embodiment. A user interface screen 300 (shown in FIG. 3) is provided by the content management application 116 to the client system 104, which enables the user of the content management services to select preferences for personalizing and managing the volume of information received from the sources of information (e.g., content servers 108/110) as described further herein.

Figure 3:
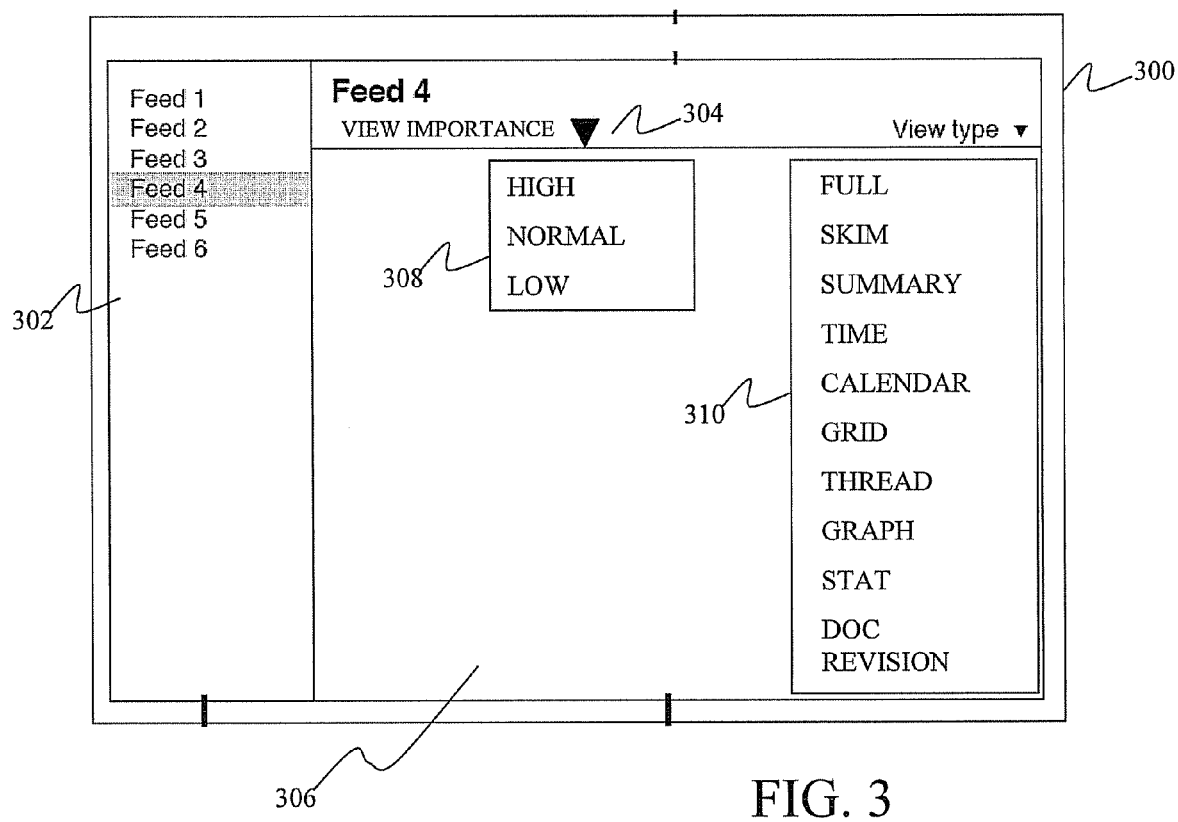
FIG. 3 is a user interface screen for creating and customizing content views in exemplary embodiments.

As shown in FIG. 3, the user interface screen 300 includes a panel 302 which displays content feeds to which the user has subscribed at step 202. The user selects preferences for viewing the content feeds at step 204. For example, the content management application 116 includes logic for applying user-selected weights to various content sources at step 206. Each of the weights represents a relevance of a content feed to which the weight has been assigned via the user preferences. For example, suppose a user selects Feed 4 from the panel 302 (not shown). The content management application 116 enters 'Feed 4' into a preference panel 304, as shown in FIG. 3. The user selects 'View Importance' from the panel 304 and a window 308 appears, which lists the available options for assigning weights to the feed. As shown in panel 304, there are three weights: HIGH, NORMAL, and LOW. It will be understood that the variables HIGH, NORMAL, and LOW are provided for purposes of illustration. It will be understood that other variables for defining relevance may be adopted in lieu of the above (e.g., a numeric rating). By way of example, suppose the user selects 'LOW' as the preference for Feed 4. When the user wishes to view a listing of the feeds with an assigned relevance of 'HIGH', the user would select 'Show important' in panel 302 from a drop down option and the content management application 116 displays only the feeds having this relevance value assigned thereto at step 208. As shown in FIG. 3, for example, Feeds 1, 3, 5 and 6 are shown in panel 302 and Feed 4 is absent from the listing.

As indicated above, the user may also select a preference for the manner in which a content feed is to be displayed on the user's system (client system 104). This preference may be implemented by selecting 'View type' in panel 304, which causes the content management application 116 to display a window 310. The window 310 lists the available view types, which include: FULL, SKIM, SUMMARY, TIME, CALENDAR, GRID THREAD, GRAPH, STAT, AND DOC REVISION. These view types are described further in FIGS. 4A-4J.

Once the content management application 116 receives the preference selection from the 'View type' option, the content management application 116 processes the content of the corresponding feed, looking for items that relate to the selected view type at step 206. During this process, the content management application 116 may filter out any content that does not relate to the selected view type. The criteria used in the processing may be based upon key words that have been assimilated with the view type.

Upon selecting a feed from window 308 and a view type from window 310, the content management application 116 processes the content from the selected feed according to the selected view type and displays the content formatted according to the view type in a content panel 306 of the user interface screen 300. The formatted content based upon various selected views are shown and described in FIGS. 4A-4J.

If desired, the user may modify the set preferences at any time by following the process described in FIG. 2 and selecting different preferences. In one exemplary embodiment the content management application 116 may store the preferences in storage device 112 and recall these preferences the next time the user accesses the user interface screen 300 and selects a feed. In another exemplary embodiment, the content management application 116 may be configured to process the content feed before the user selects a view type in panel 310 and suggest to the user a view type that is believed to provide an optimal view or perspective of the content (e.g., where a content feed is directed to providing a listing of upcoming concert events, the content management application 116 may identify a high percentage of date-type information and suggest a view type CALENDAR to the user after the user selects the feed but before the user selects a particular view type.

With respect to the relevance preference, the content management application 116 may be configured to automatically assign a particular relevance value to the data feed based upon criteria, such as the frequency in which the user accesses a particular feed. Alternatively, the content management application 116 may suggest a particular relevance value to the user for a data feed based on similar criteria. Likewise, the content management application 116 may be configured to review activities taken with respect to various content feeds and suggest feeds for deletion based on a lack of interest in the feeds, e.g., as determined by infrequent activity.

Figure 4A:
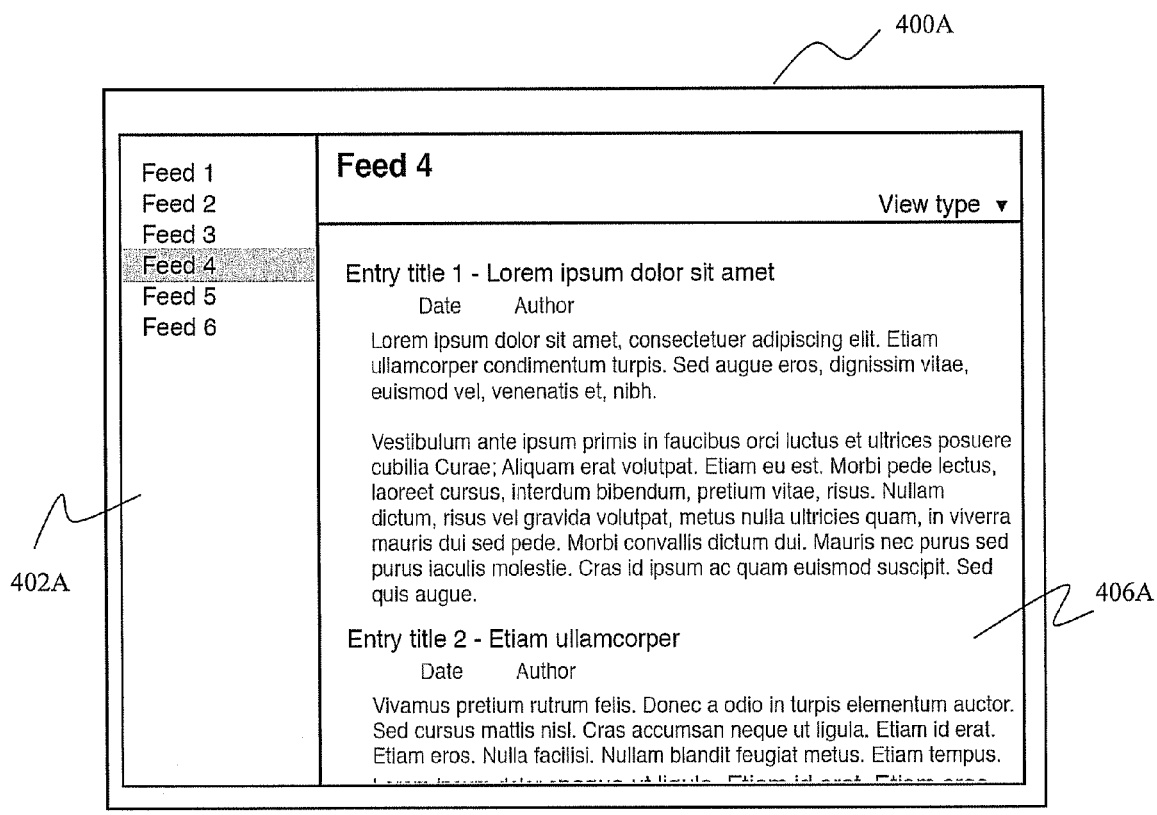
FIGS. 4A-4J are user interface screens depicting sample customized content views created via the user interface screen of FIG. 3 in exemplary embodiments.

As indicated above, the content management application 116 provides multiple view types for selection by a user. A user interface screen 400A in FIG. 4A illustrates the view type FULL, which represents a view of the full content for the selected feed including images for every entry in the feed. As shown in FIGS. 3 and 4A, a user selects Feed 4 from panel 402A and selects 'View type' FULL from panel 310, and the full content of the selected feed is displayed in a content panel 406A of the user interface screen 400A.

Figure 4B:
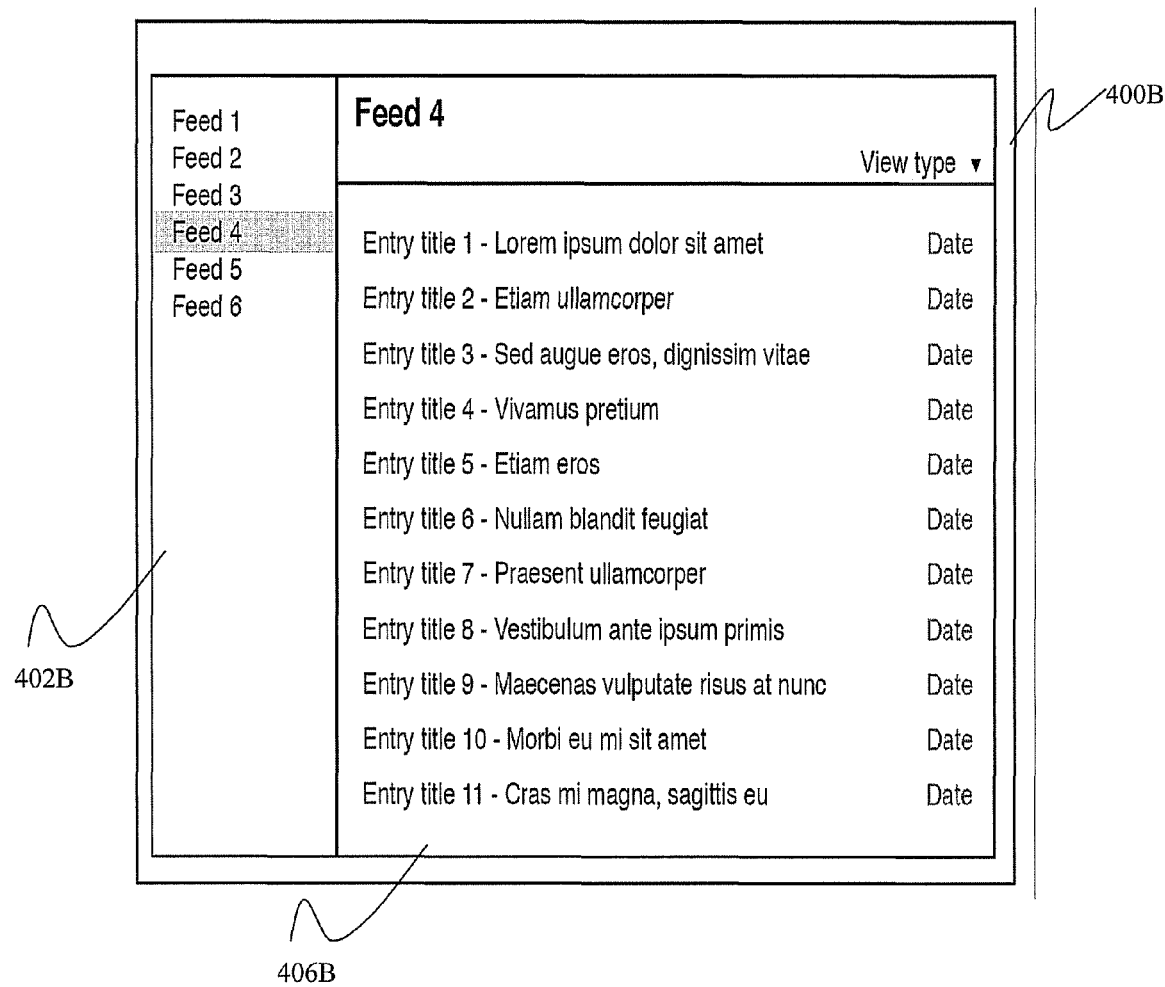

A user interface screen 400B in FIG. 4B illustrates the view type SKIM, which represents an abbreviated view of the content for the selected feed. As shown in FIGS. 3 and 4B, a user selects Feed 4 from panel 402B and selects 'View type' SKIM from panel 310, and the date and title of every entry for the selected feed is displayed in a content panel 406B of the user interface screen 400B. As shown in FIG. 4B, the SKIM view enables the user to skim across many entries at once.

Figure 4C:
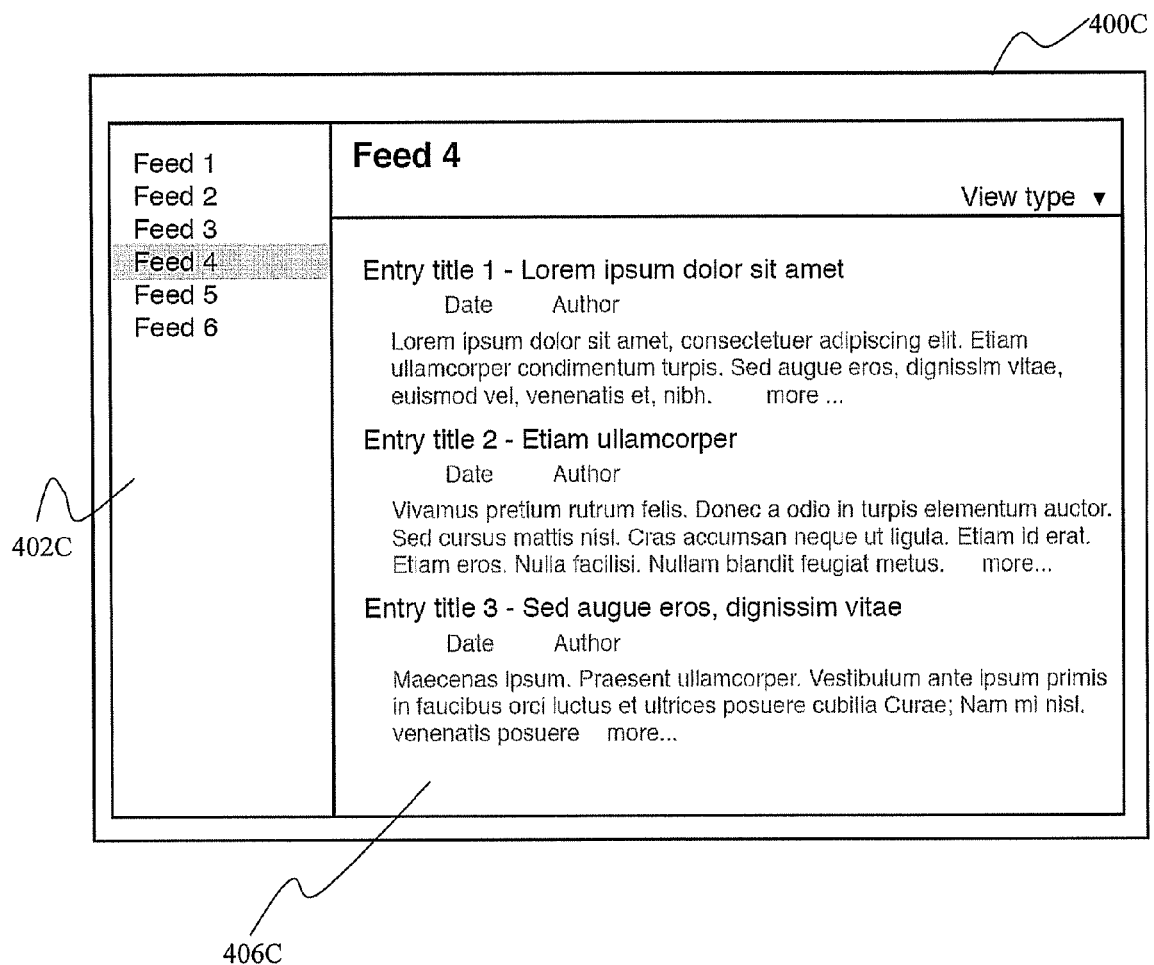

A user interface screen 400C in FIG. 4C illustrates the view type SUMMARY, which represents a cross between the full content view and skim view of the content for the selected feed. As shown in FIGS. 3 and 4C, a user selects Feed 4 from panel 402C and selects 'View type' SUMMARY from panel 310, and a fixed size summary for each entry for the selected feed is displayed in a content panel 406C of the user interface screen 400C.

Figure 4D:
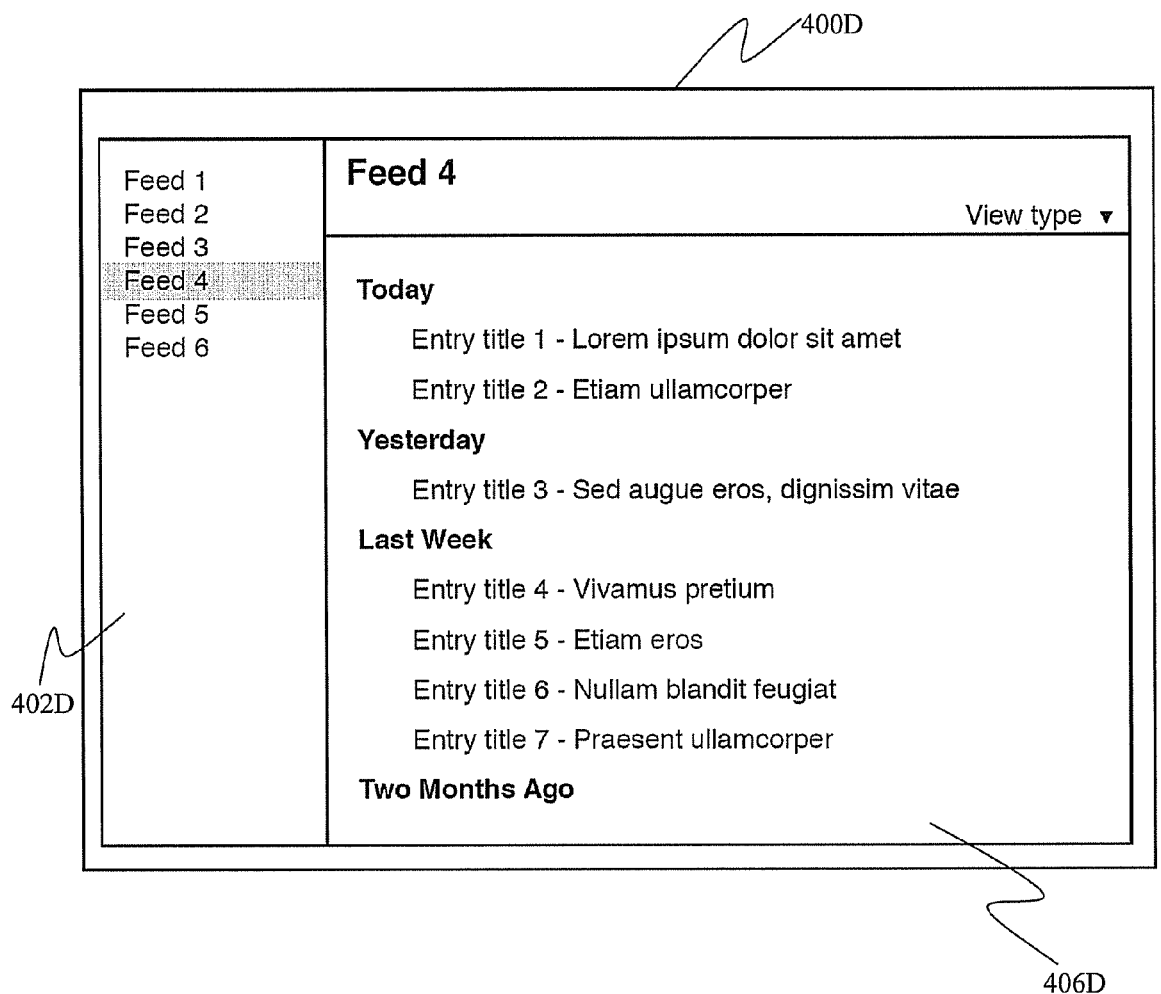

A user interface screen 400D in FIG. 4D illustrates the view type TIME, which illustrates a time view of entries in content for the selected feed. As shown in FIGS. 3 and 4D, a user selects Feed 4 from panel 402D and selects 'View type' TIME from panel 310, and view of each of the entries grouped by time for the selected feed is displayed in a content panel 406D of the user interface screen 400D. The time view may be based upon a date in which the entry for the content feed is published or syndicated.

Figure 4E:
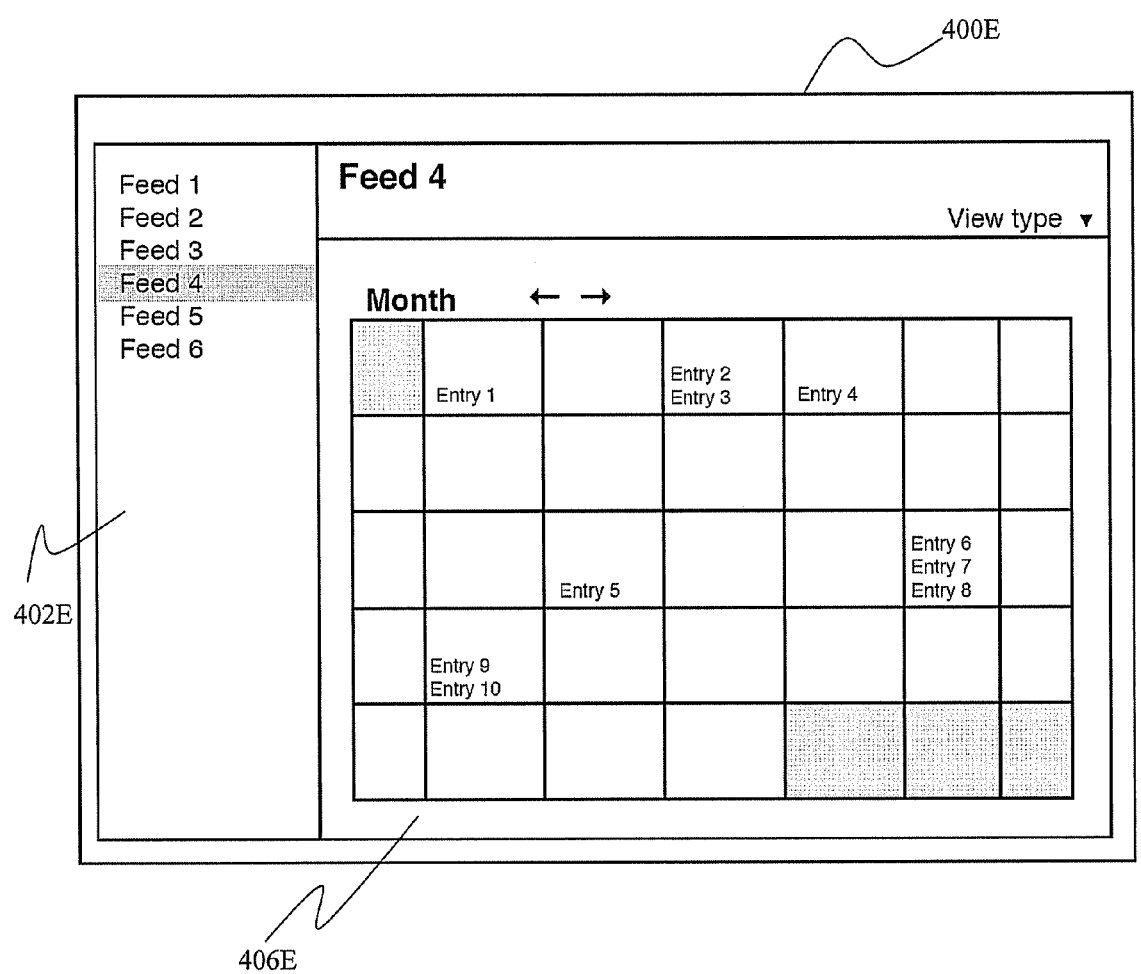

A user interface screen 400E in FIG. 4E illustrates the view type CALENDAR, which represents a view of entries on a calendar for the selected feed. As shown in FIGS. 3 and 4E, a user selects Feed 4 from panel 402E and selects 'View type' CALENDAR from panel 310, and view of each of the entries grouped by calendar date for the selected feed is displayed in a content panel 406E of the user interface screen 400E. In alternative exemplary embodiments, the CALENDAR view may display events listed in the entries according to a corresponding calendar date (e.g., concert event A in Entry 1 is populated in the CALENDAR view according to the concert date in lieu of 'Entry 1'). Thus, the CALENDAR view may be based upon a date in which the entry for the content feed is published, or may be based upon a date in which an event for a content feed entry occurs, or may be based upon a combination of the above.

Figure 4F:
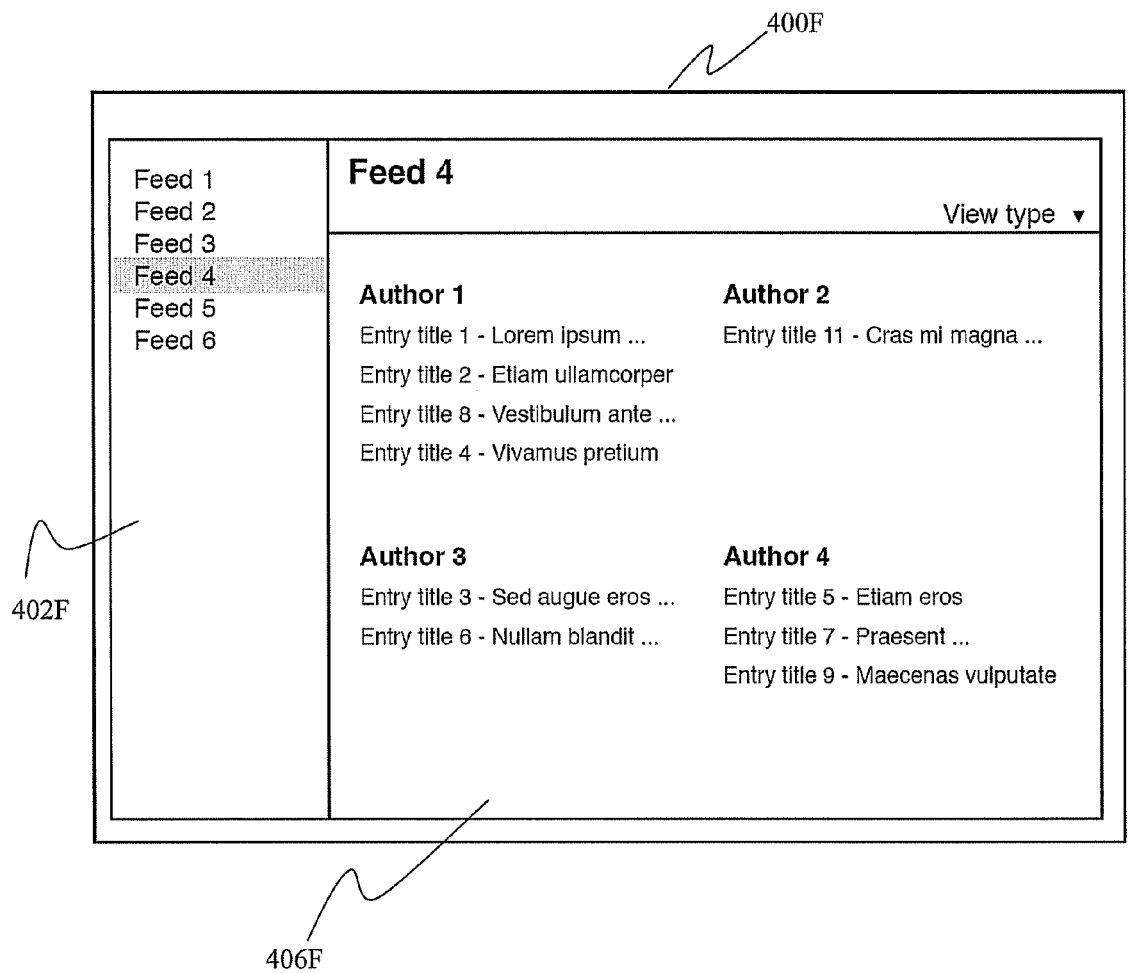

A user interface screen 400F in FIG. 4F illustrates the view type GRID, which represents a view of entries grouped in a grid by a particular characteristic of the selected feed. For example, as shown in FIG. 4F, the entries for the content feed are grouped by the author of the entries. Other characteristics that may be used to group entries within a grid include, e.g., tag, category, type, urgency, time of day, and to name a few). As shown in FIGS. 3 and 4F, a user selects Feed 4 from panel 402F and selects 'View type' GRID from panel 310, and view of each of the entries grouped by author for the selected feed is displayed in a content panel 406F of the user interface screen 400F.

Figure 4G:
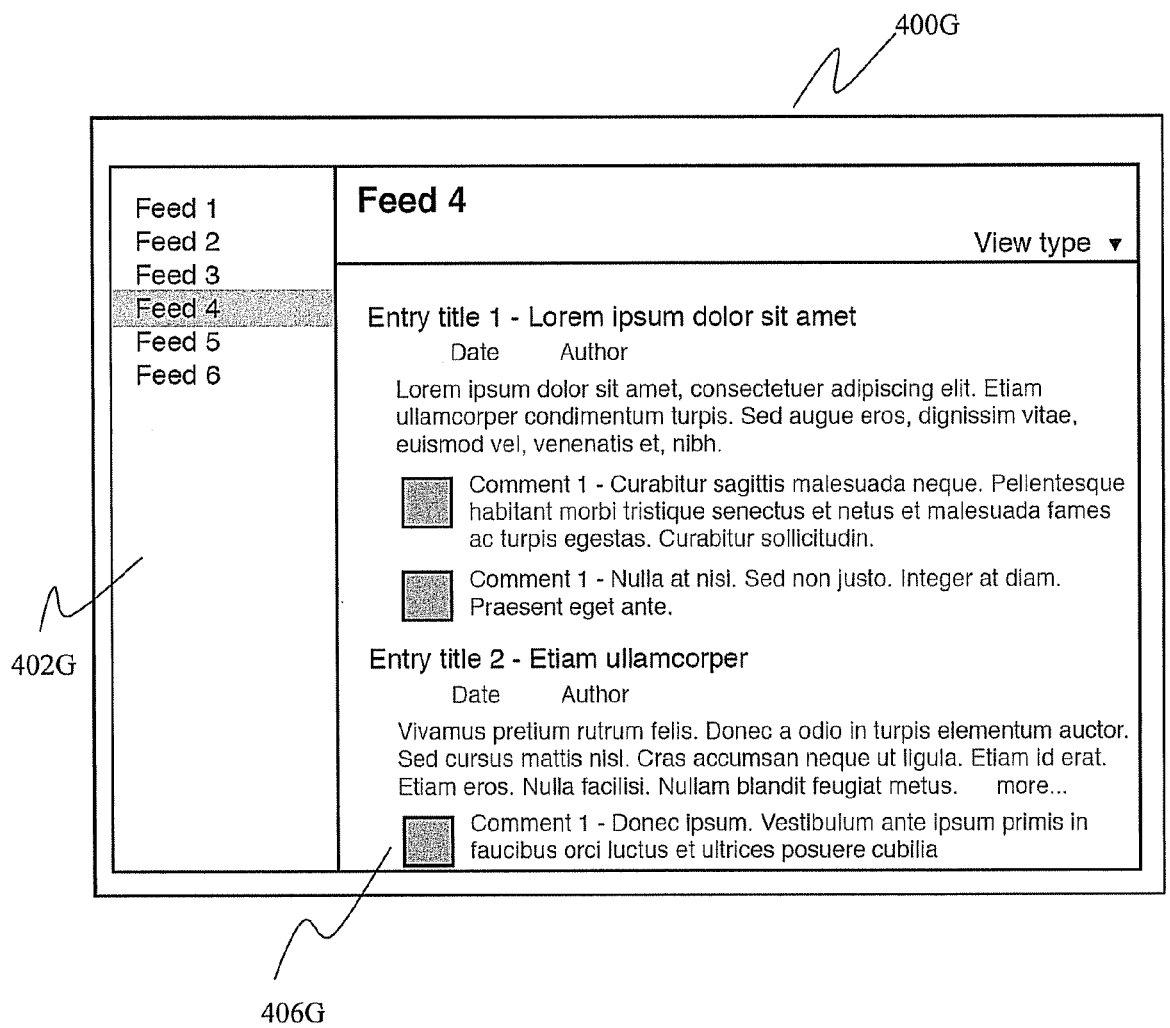

A user interface screen 400G in FIG. 4G illustrates the view type THREAD, which illustrates a time view of the full content of entries including any response threads for each entry of the selected feed. As shown in FIGS. 3 and 4G, a user selects Feed 4 from panel 402G and selects 'View type' THREAD from panel 310, and view of each of the entries including full content and corresponding response threads for the selected feed is displayed in a content panel 406G of the user interface screen 400G. This type of view may be useful for sources of information having discussions such as email, blogs, forums, and team rooms. Since the thread is inline, there is no need to visit another location to view and participate in the discussion.

Figure 4H:
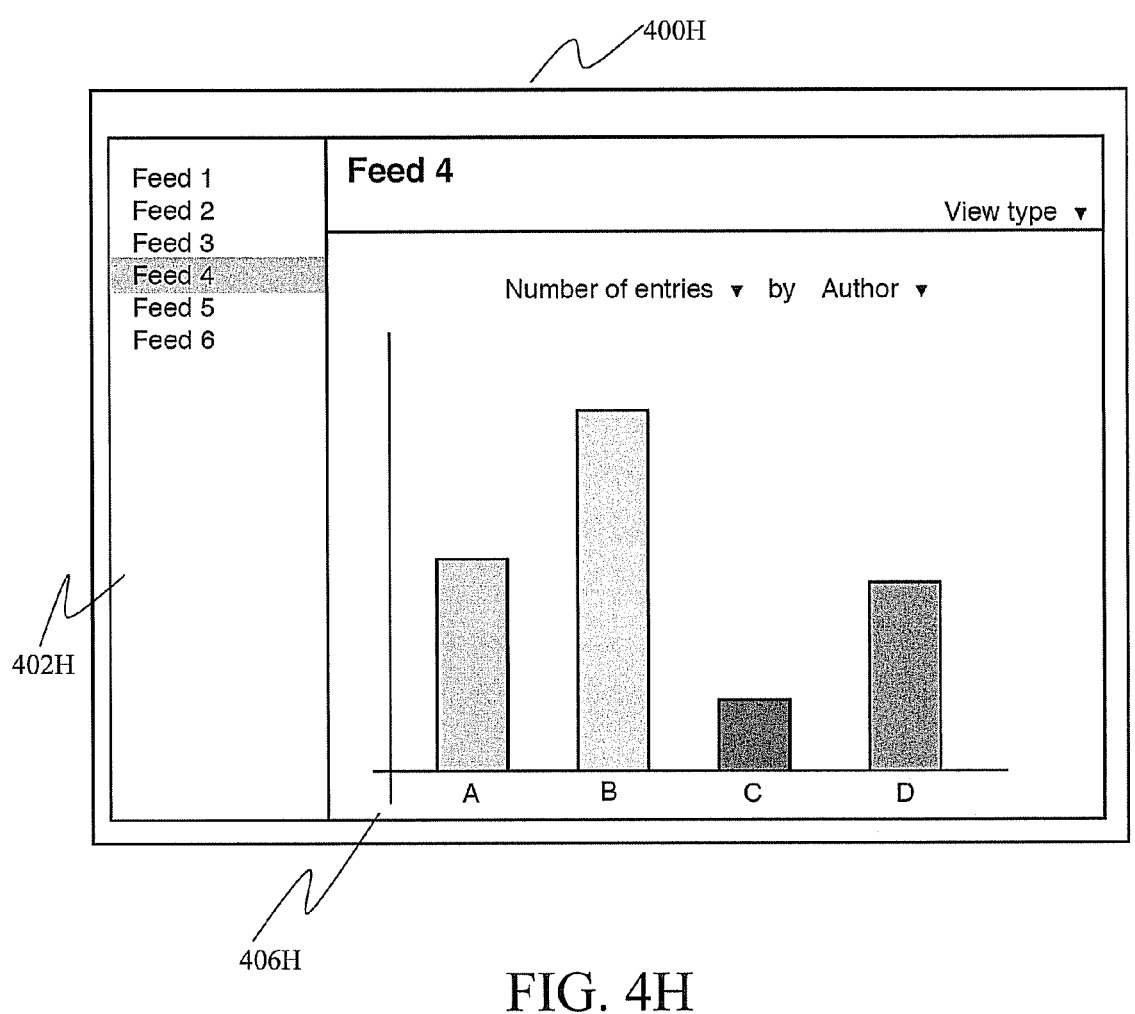

A user interface screen 400H in FIG. 4H illustrates the view type GRAPH, which renders a visual view of the selected feed as a graph according to specified characteristics (e.g., the number of entries tagged RSS in the past four weeks, the number of entries from four different feeds, the number of unique authors for the past four months, the number of support requests from four clients, and the number of bugs fixed by developers, to name a few). As shown in FIGS. 3 and 4H, a user selects Feed 4 from panel 402H and selects 'View type' GRAPH from panel 310, and a graphical view of the entries according to the related characteristics for the selected feed is displayed in a content panel 406H of the user interface screen 400H.

Figure 4I:
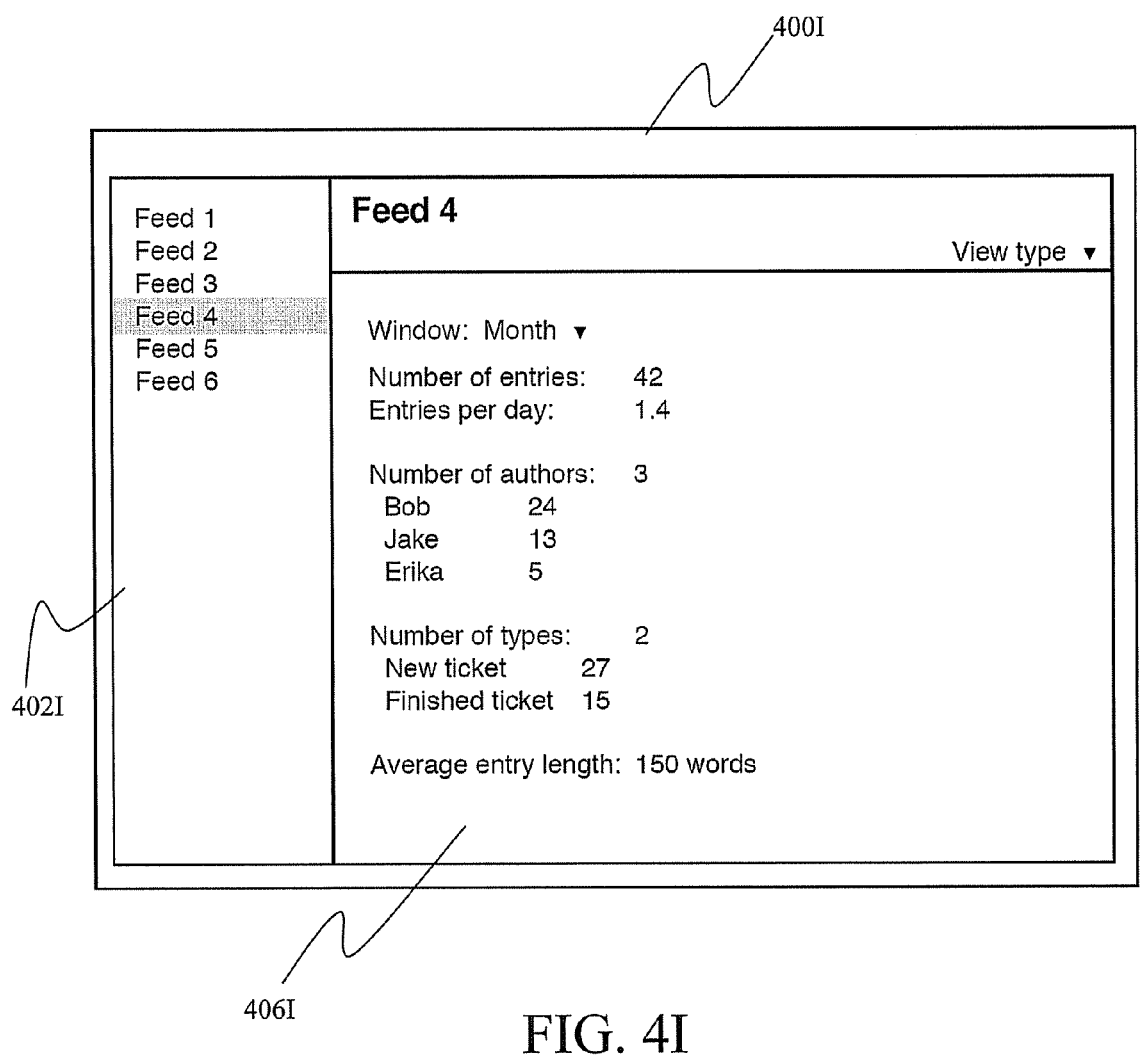

A user interface screen 400I in FIG. 4I illustrates the view type STAT, which represents a statistic view of the selected feed during a specified window of time. As shown in FIGS. 3 and 4I, a user selects Feed 4 from panel 402I and selects 'View type' STAT from panel 310, and a view of the entries are rendered in a numerically statistical form according to various characteristics (e.g., those characteristics described above) for the selected feed is displayed in a content panel 406I of the user interface screen 400I.

Figure 4J:
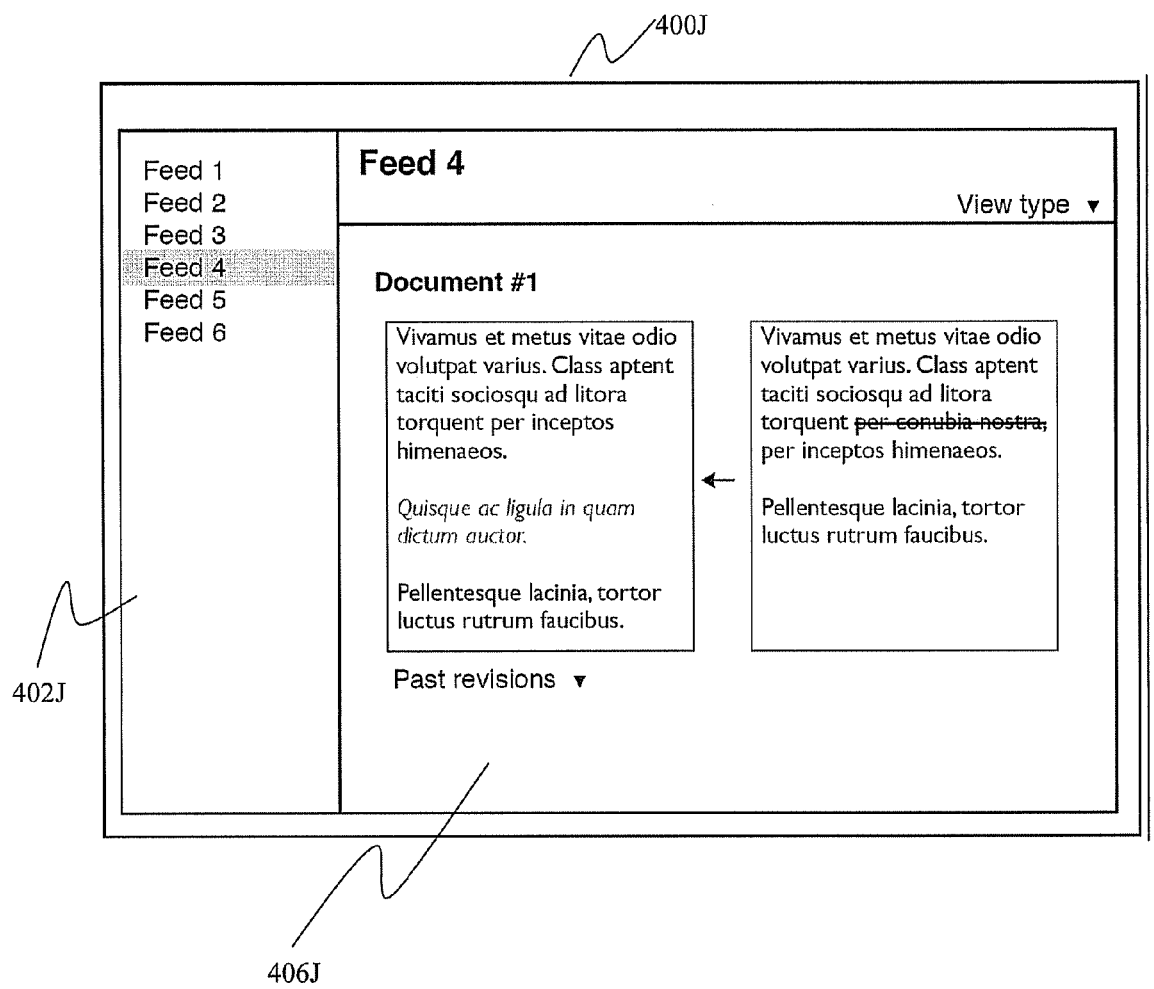

A user interface screen 400J in FIG. 4J illustrates the view type DOC REVISION, which represents a view illustrating the differences between versions of an entry that has been updated. This type of view is useful when keeping tables on the changes made to a document or wiki. As shown in FIGS. 3 and 4J, a user selects Feed 4 from panel 402J and selects 'View type' DOC REVISION from panel 310, and a view of the entry versions highlighting the changes (e.g., via strikethrough for deleted text and color change for added text) is rendered for the selected feed and displayed in a content panel 406J of the user interface screen 400J.

As described above with respect to FIG. 1, the content management system of the present invention may reside on a stand-alone computer system, which may have access to the Internet, or may reside on a computer system which is part of the network through which there is Internet access. With a connection to a network and/or the Internet, there are several different ways in which the process software used to implement the systems and methods of the intelligent team management system may be integrated with the network, and deployed using a local network, a remote network, an e-mail system, and/or a virtual private network. The following descriptions review the various ways of accomplishing these activities.

Integration of Content management System Software. To implement the content management systems and methods of the present invention, process software, which is composed of the software as described above and related components including any needed data structures, is written and then if desired, integrated into a client, server, and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 5A and 5B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems are identified and compared to the list of operating systems, version numbers, and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 5A:
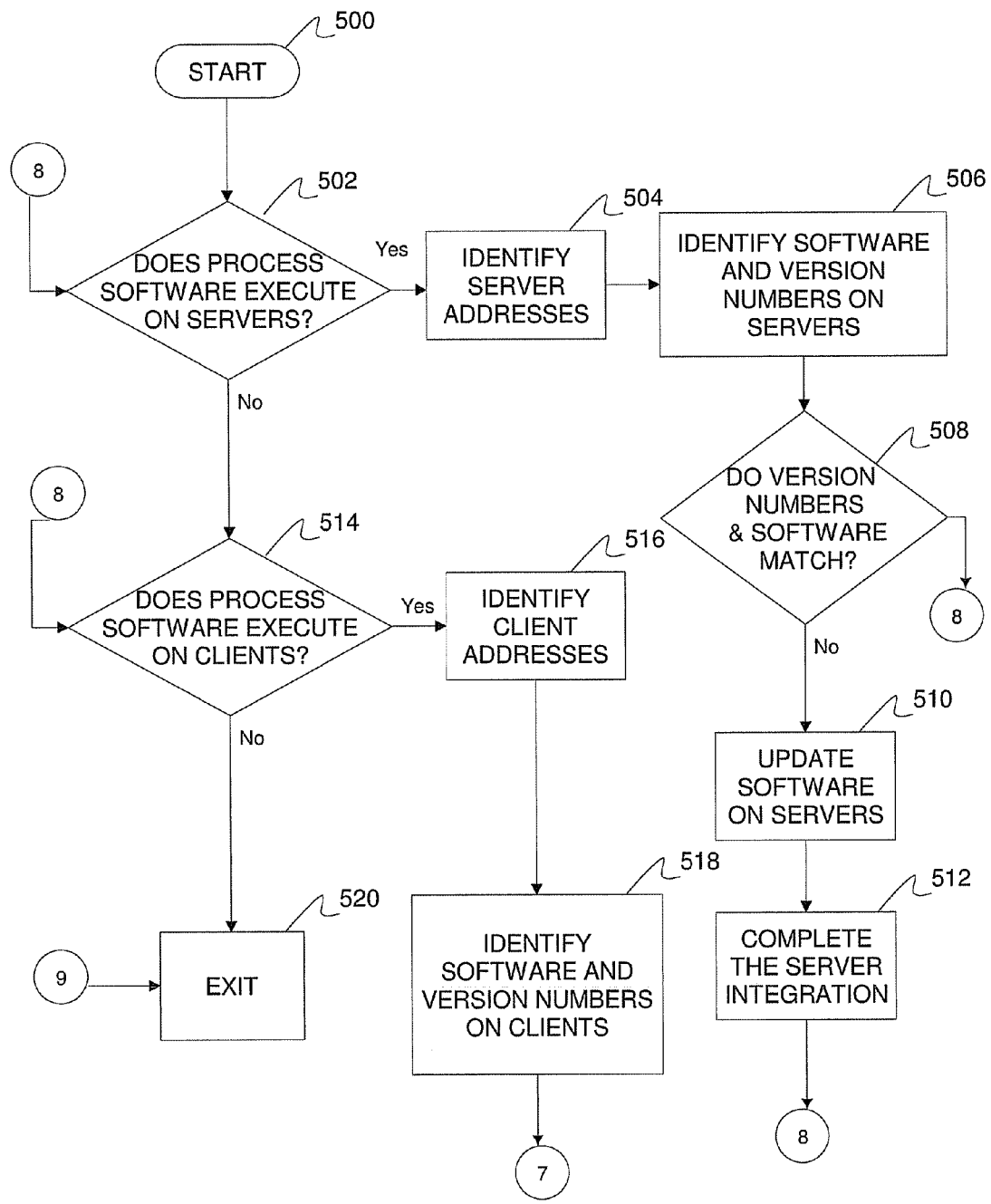
FIGS. 5A and 5B are flowcharts illustrating how the process software implementing the systems and methods of the invention may be integrated into client, server, and network environments.
Figure 5B:
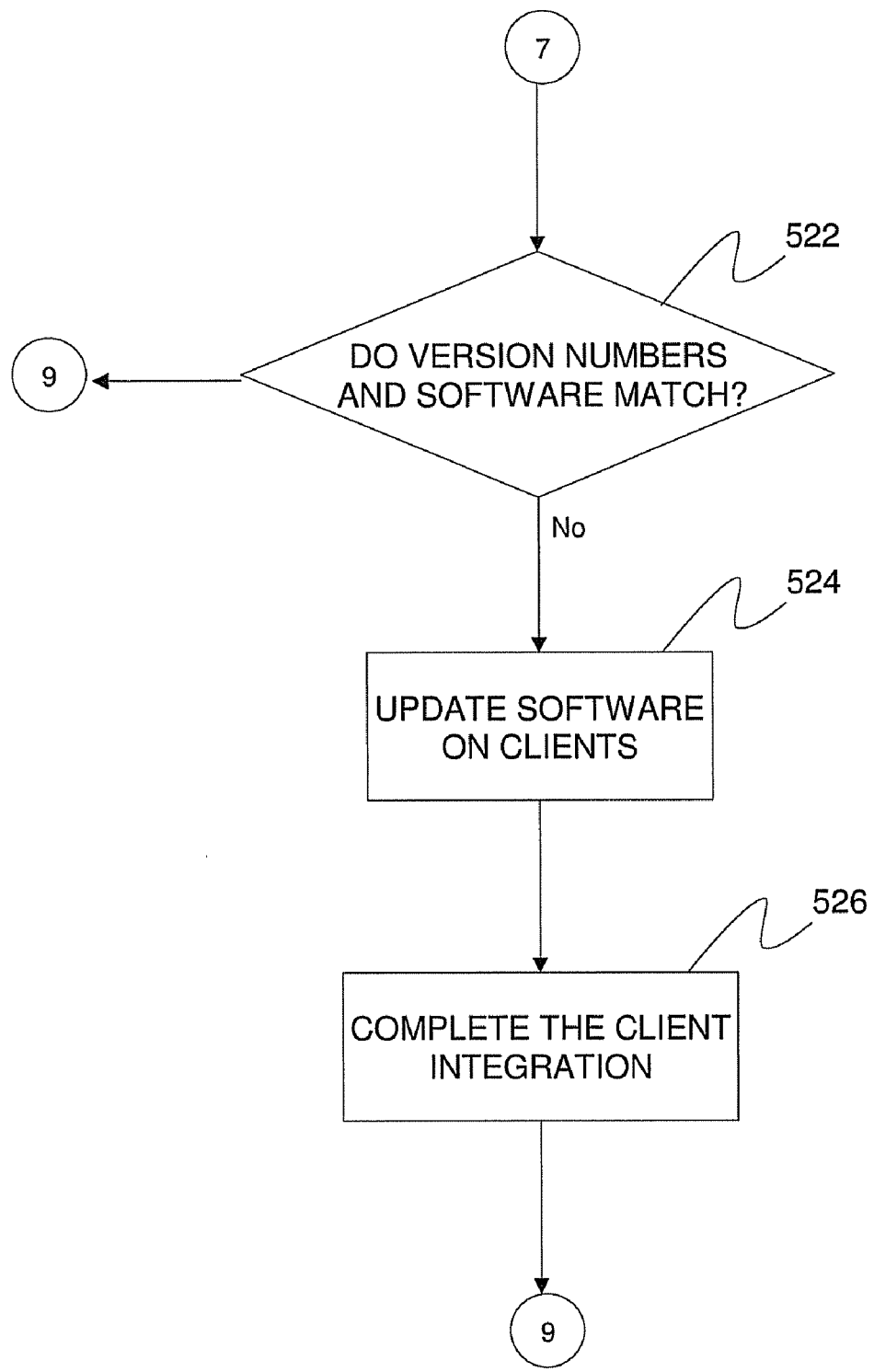

Referring to FIGS. 5A and 5B, step 500 begins the integration of the process software for implementing the content management systems and methods of the present invention. It is determined whether there are any process software programs that will execute on a server or servers at step 502. If this is not the case, then integration proceeds to determine if the process software will execute on clients at step 514. If there are process software programs that will execute on a server(s), then the server addresses are identified at step 504. The servers are checked to see if they contain software that includes the operating system (OS), applications, and network operating systems (NOS), together with their version numbers, that have been tested with the process software at step 506. The servers are also checked to determine if there is any missing software that is required by the process software as part of the activity at step 506. A determination is made whether the version numbers match the version numbers of OS, applications and NOS that have been tested with the process software at step 508. If all of the versions match, and there is no missing required software, the integration continues at step 514. If one or more of the version numbers do not match, then the unmatched versions are updated on the server or servers with the correct versions at step 510. Additionally, if there is missing required software, then it is updated on the server or servers at step 510. The server integration is completed by installing the process software at step 512.

Step 514, which follows either step 502, 508 or 512, determines if there are any programs of the process software that will execute on the clients. If no process software programs execute on the clients, the integration proceeds to step 520 and exits. If there are process software programs that will execute on clients, the client addresses are identified at step 516.

At step 518, the clients are checked to see if they contain software that includes the operating system (OS), applications, and network operating systems (NOS) software, together with their version numbers, that have been tested with the process software. The clients are also checked at step 518 to determine if there is any missing software that is required by the process software.

At step 522, a determination is made if the version numbers match the version numbers of OS, applications and NOS that have been tested with the process software. If all of the versions match, and there is no missing required software, then the integration proceeds to step 520 and exits.

If one or more of the version numbers do not match, then the unmatched versions are updated on the clients with the correct versions at step 524. In addition, if there is missing required software, then it is updated on the clients as part of step 524. The client integration is completed by installing the process software on the clients at step 526. The integration proceeds to step 520 and exits.

Deployment of Content management System Software. It should be well understood that the process software for implementing the content management system of the present invention may be deployed by manually loading the process software directly into the client, server, and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of the same with reference to FIGS. 6A and 6B, where the deployment processes are illustrated, will be more easily understood.

Step 600 begins the deployment of the process software. It is determined whether there are any programs that will reside on a server or servers when the process software is executed at step 602. If the answer is "yes", then the servers that will contain the executables are identified, as indicated in step 636 in FIG. 6B. The process software for the server or servers is transferred directly to the servers' storage via FTP or some other protocol or by copying though the use of a shared file system at step 638. The process software is then installed on the servers as indicated at step 640.

Figure 6A:
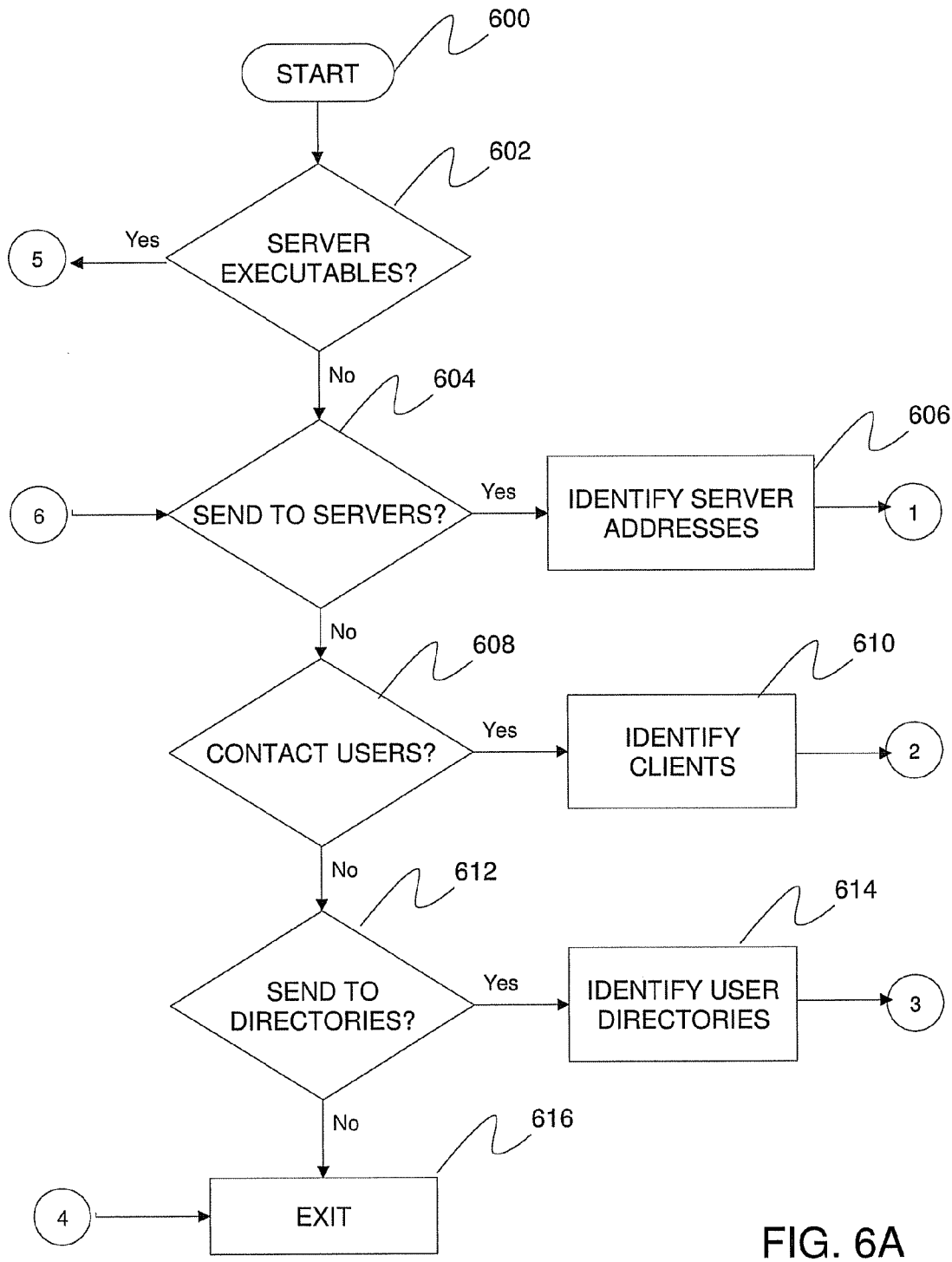
FIGS. 6A and 6B are flowcharts illustrating various ways in which the process software of the invention may be semi-automatically or automatically deployed across various networks and onto server, client (user), and proxy computers.
Figure 6B:
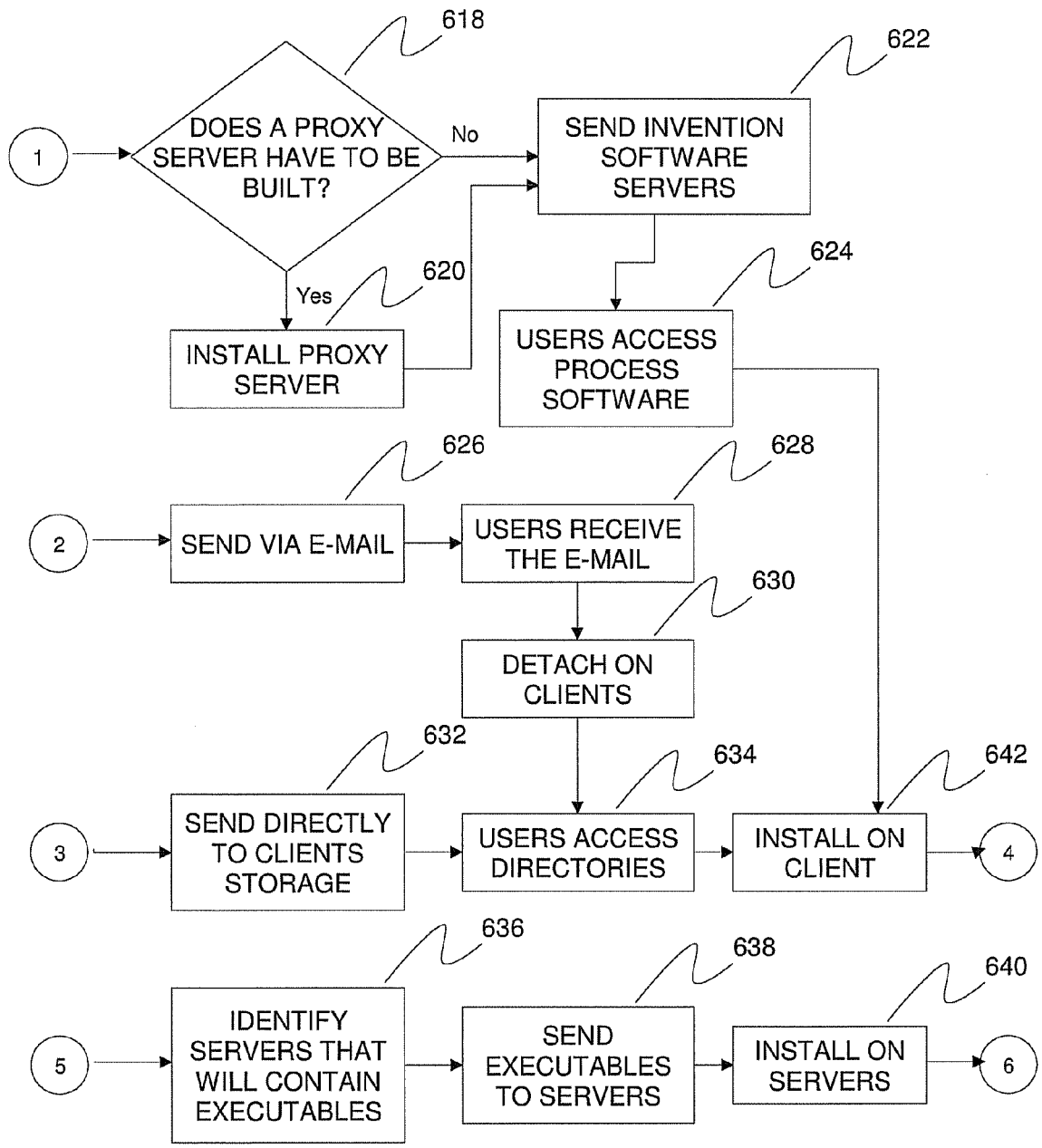

Next, as shown in step 604 in FIG. 6A, a determination is made on whether the process software is to be deployed by having users access the process software on a server or servers. If the users are to access the process software on servers, then the server addresses that will store the process software are identified at step 606.

Next, as shown at step 618, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 620. Next, the process software for implementing the present invention is sent to the servers, as indicated in step 622 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 624. Another alternative is to have the servers automatically copy the process software to each client and then run the installation program for the process software at each client computer. Either way, the user computer executes or causes to be executed the program that installs the process software on the client computer at step 642, then the process exits at step 616.

Continuing now at step 608 in FIG. 6A, a determination is made as to whether the process software is to be deployed by sending the process software to users via e-mail. If the answer is yes, then, as indicated at step 610, the set of users where the process software will be deployed are identified together with the addresses of the user client computers. The process software is sent via e-mail in step 626 (shown in FIG. 6B) to each of the users' client computers. Then, as indicated in step 628, the users receive the e-mail, and then detach the process software from the e-mail to a directory on their client computers at step 630. The user then executes the program that installs the process software on his client computer at step 642, and then exits the process at step 616.

Continuing at step 612 (see bottom of FIG. 6A), a determination is made on whether the process software will be sent directly to user directories on their client computers. If so, the user directories are identified at step 614. Then, the process software is transferred directly to the identified directory on the user's client computer, as indicated in step 632. This can be done in several ways such as, but not limited to, sharing of the file system directories and then copying them from the sender's file system to the recipient user's file system or, alternatively, using a transfer protocol such as File Transfer Protocol (FTP). Next, the users access the directories on their client file systems, as indicated in step 634, in preparation for installing the process software. Finally, the user executes the program that installs the process software on his client computer at step 642 and then exits the process at step 616.

Use of Virtual Private Networks for Content management System Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as a leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 7A-7C should be more readily understood.

Figure 7A:
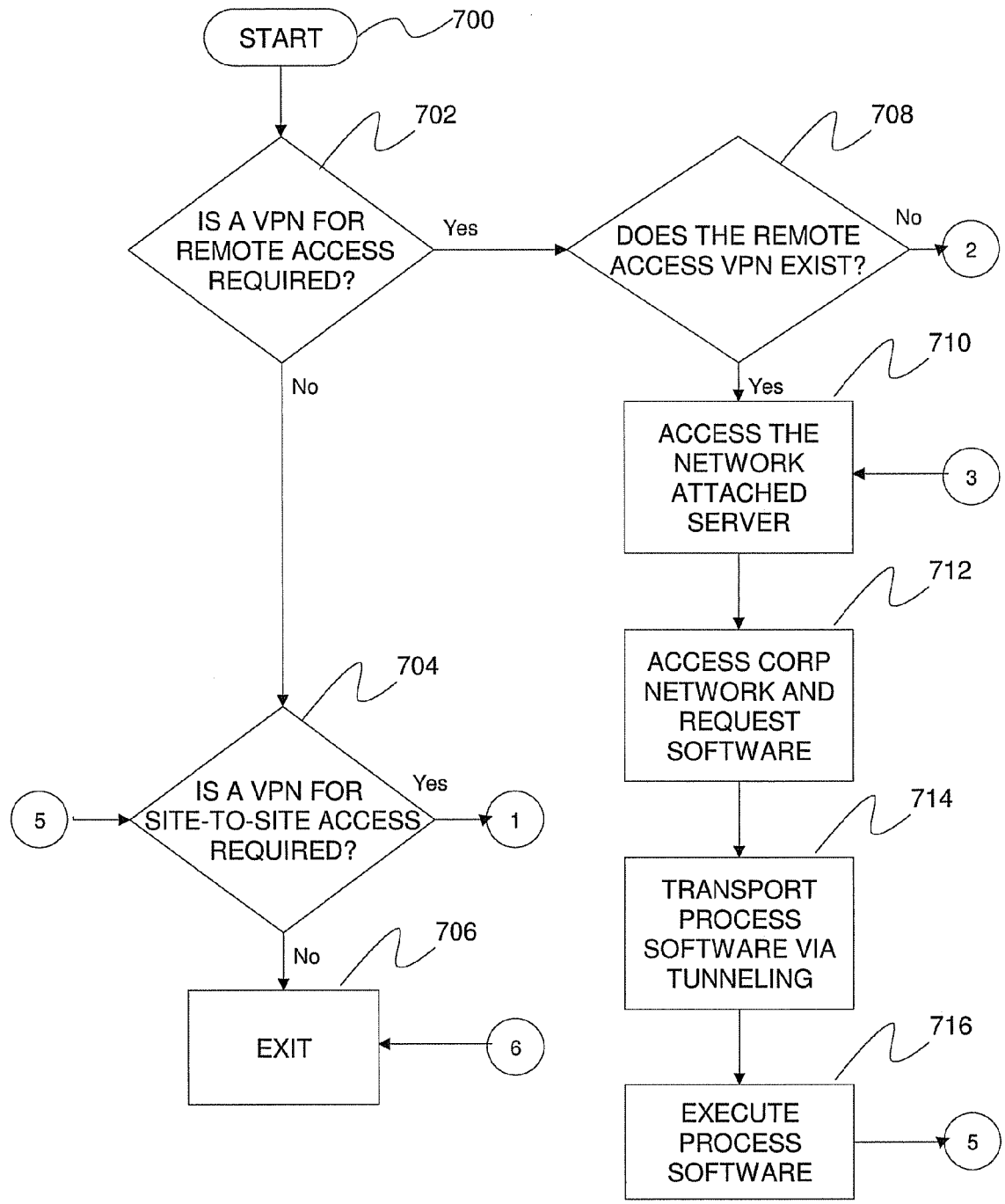
FIGS. 7A through 7C are flowcharts illustrating how process software for implementing the systems and methods of the invention are deployed through the installation and use of two different forms of a virtual private network (VPN)
Figure 7B:
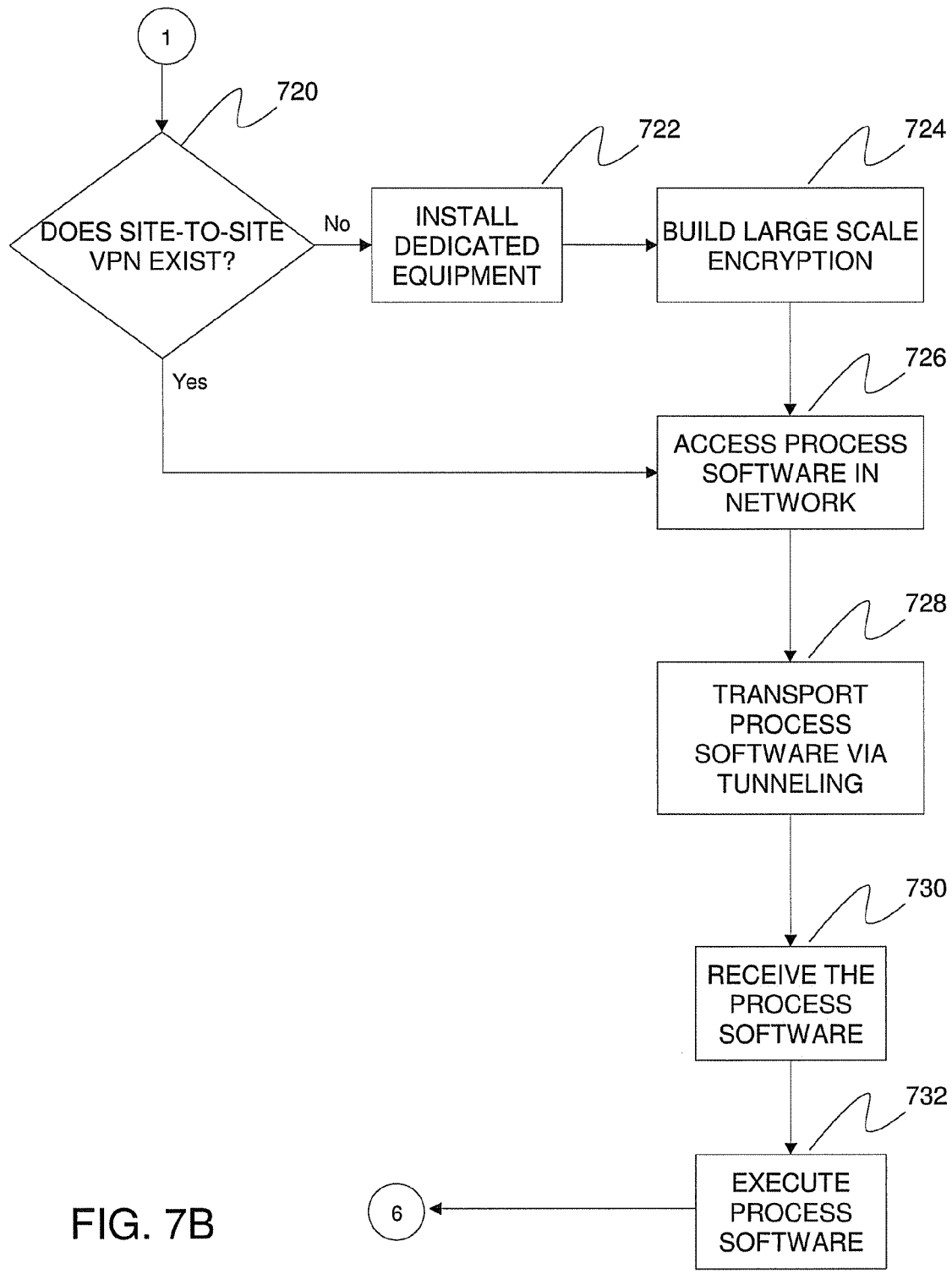
Figure 7C:
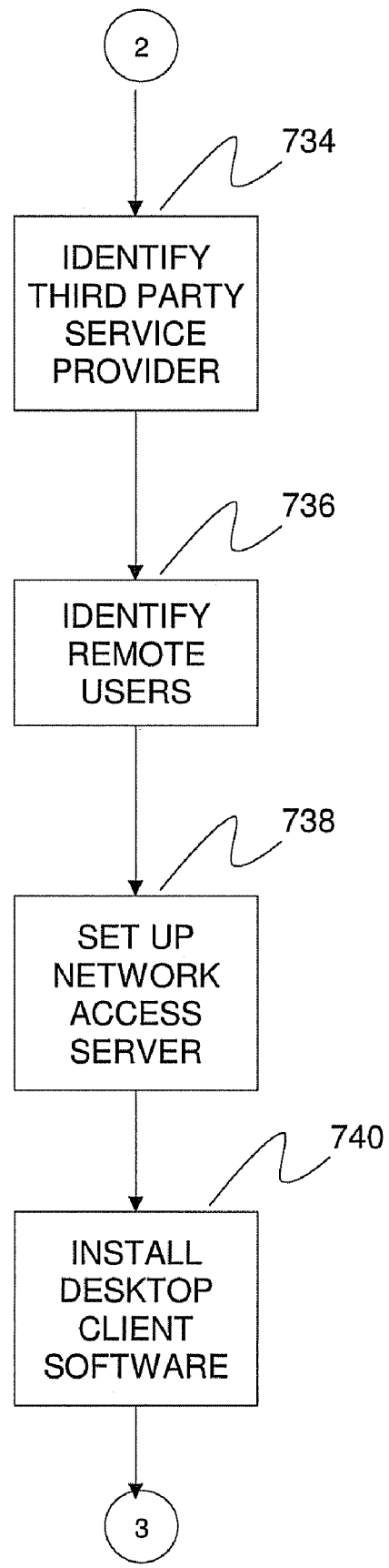

Step 700 in FIG. 7A begins the virtual private network (VPN) process. A determination is made at step 702 to see if a VPN for remote access is required. If it is not required, then flow proceeds to step 704. If it is required, then flow proceeds to step 708 where a determination is made as to whether a remote access VPN exists that is available for use.

If a remote access VPN does exist, then flow proceeds to step 710 in FIG. 7A. Otherwise flow proceeds to step 734 (see top of FIG. 7C), where a third party provider that will provide the secure, encrypted connections between the company's private network and the company's remote users is identified. Next, as indicated in step 736, the company's remote users are identified. Then, at step 738, the identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 740.

Returning to step 710 in FIG. 7A, after the remote access VPN has been built or if it been previously installed, the remote users can then access the process software by dialing into the NAS or attaching directly via a cable, DSL, or other modem into the NAS. This step 710 allows entry into the corporate network, as indicated at step 712, where the process software may be accessed. The process software is transported to the remote user's desktop computer over the network via tunneling. During tunneling, see step 714, the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 716.

Returning now to step 704 in FIG. 7A, a determination is made to see if a VPN for site-to-site access is required. If it is not required, then the process exits at step 706. If it is required, flow proceeds to step 720 (see top of FIG. 7B) to determine if the site-to-site VPN exists. If it does exist, then flow proceeds to step 726. If it does not exist, then as indicated at step 722, dedicated equipment required to establish a site-to-site VPN is installed. Then the large-scale encryption is built into the VPN at step 724.

After the site-to-site VPN has been built or if it had been previously established, the users access the process software via the VPN as indicated in step 726. Next, the process software is transported to the site users over the network via tunneling as indicated in step 728. As previously explained, the process software is divided into packets and each packet including the data and protocol is placed within another packet, as indicated in step 730. When the process software arrives at the remote user's desktop, it is removed from the packets, reconstituted, and is executed on the site users desktop at step 732. The process then proceeds to step 706 and exits.

Figure 8A:
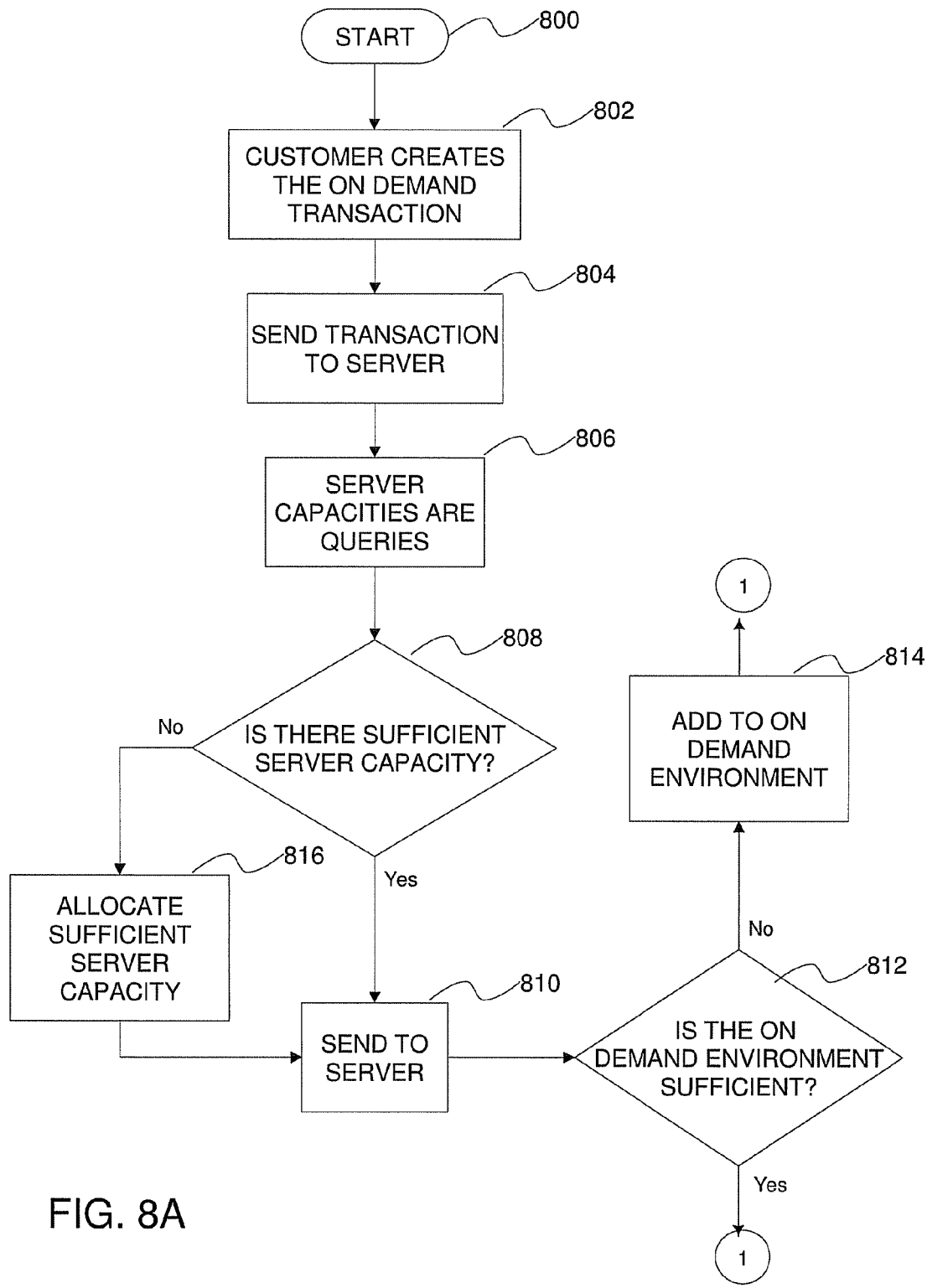
FIGS. 8A and 8B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 8B:
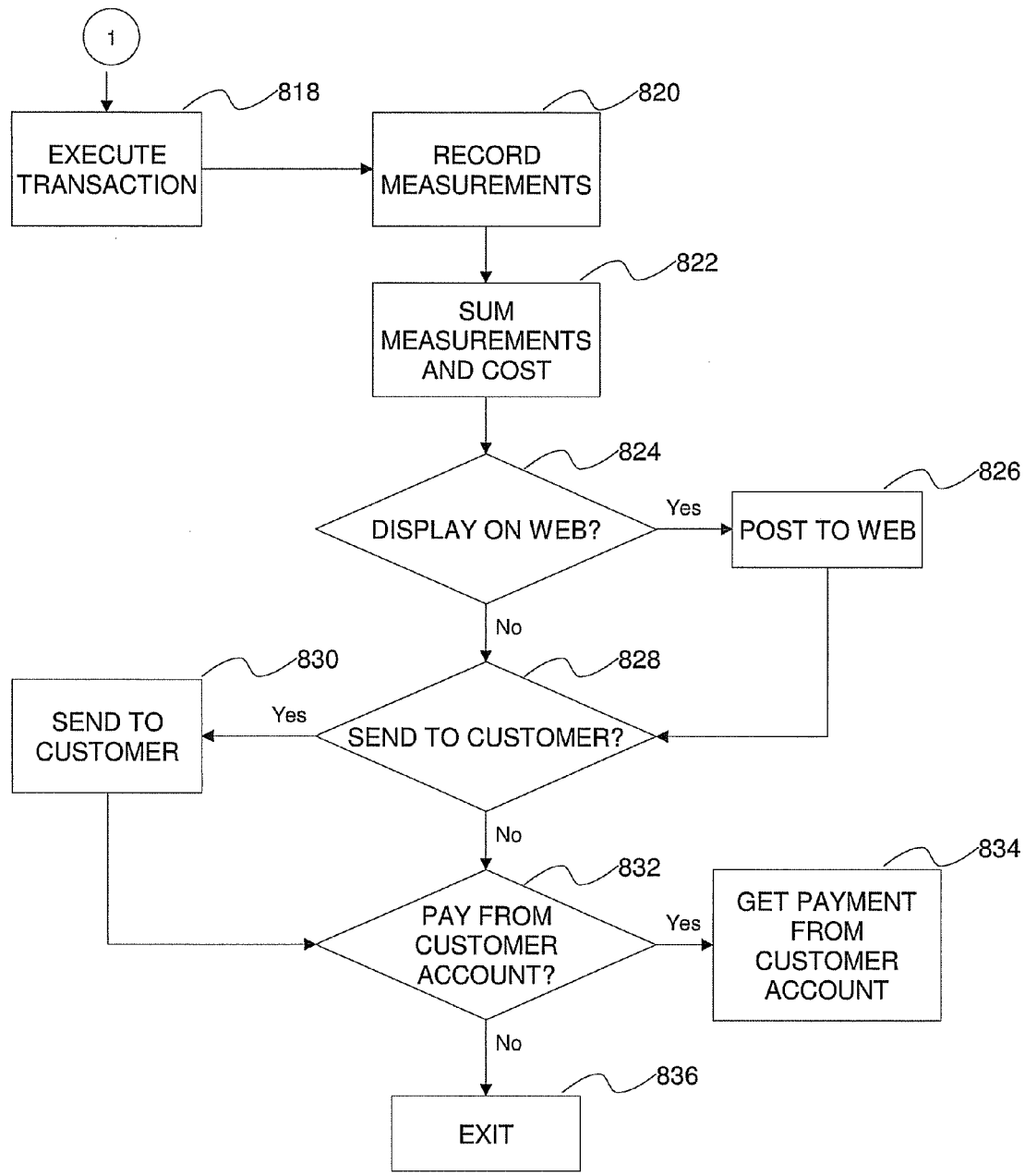

On Demand Computing for Content management System Software. The process software for implementing the content management system of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the intelligent team management system software will now be provided, followed by a more detailed description of same made with reference to the flowcharts of FIGS. 8A and 8B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, and the following detailed description of same with reference to FIGS. 8A and 8B where the on demand processes are illustrated, will be more easily understood.

Step 800 begins the On Demand process. A transaction is created that contains the unique customer identification, the requested service type and any service parameters that further specify the type of service as indicated in step 802. The transaction is then sent to the main server as shown in step 804. In an On Demand environment, the main server may initially be the only server. Then, as capacity is consumed, other servers are added to the On Demand environment.

The server central processing unit (CPU) capacities in the On Demand environment are queried at step 806. The CPU requirement of the transaction is estimated, then the servers' available CPU capacity in the On Demand environment are compared to the transaction CPU requirement to see if there is sufficient CPU available capacity in any server to process the transaction as indicated in step 808. If there is not sufficient server CPU available capacity, then additional server CPU capacity is allocated to process the transaction as indicated in step 816. If there was already sufficient available CPU capacity, the transaction is sent to a selected server at step 810.

Before executing the transaction, a check is made of the remaining On Demand environment to determine if the environment has sufficient available capacity for processing the transaction as indicated at step 812. This environment capacity consists of elements such as, but not limited to, network bandwidth, processor memory, storage, etc. If there is insufficient available capacity, then capacity will be added to the On Demand environment as indicated in step 814. Next the required software to process the transaction is accessed, loaded into memory, and the transaction is executed as indicated in step 818.

The usage measurements are recorded as indicated in step 820. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 822.

If the customer has requested that the On Demand costs be posted to a web site as indicated in step 824, then they are posted to a web site at step 826. If the customer has requested that the On Demand costs be sent via e-mail to a customer address as indicated in step 828, then they are sent to the customer via e-mail as indicated in step 830. If the customer has requested that the On Demand costs be paid directly from a customer account at step 832, then payment is received directly from the customer account at step 834. The On Demand process proceeds to step 836 and then exits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for providing content management services, comprising:
    displaying a listing of content feeds within a user interface screen, each of the content feeds representing a list of content entries;
    receiving preferences via a user interface, the preferences including:
    a weighting factor representing a relevance of content sources identified for each of the content feeds in context with others of the content feeds in the listing; and
    a view type selected from a list of view types to each of the content feeds in the listing, each of the view types representing a manner in which information in the content feeds is displayed via the user interface;

applying the preferences to the content feeds, comprising:
for each of the content feeds, searching for content in a corresponding content feed using key words that have been assimilated with the view type selected; and
displaying results of the applying the preferences via the user interface screen, the results representing a modified form of a selected content feed;
wherein the view types include a calendar view that displays at least one of:
events listed in the entries for a selected content feed according to corresponding calendar dates identified for the events in the selected content feed; and
entries for the selected content feed populated in a location in the calendar view representative of corresponding dates in which the entries are published.

2. The method of claim 1, wherein the preferences are user-selected preferences; and
wherein at least one of the preferences is determined according to suitability of a view type for a specified content feed.

3. The method of claim 1, wherein the view types include:
a full content view;
an abbreviated view;
a summary view;
a time view;
a grid view;
a thread view;
a graph view;
a statistical view; and
a document revision view.

4. The method of claim 3, wherein the time view displays entries in a selected content feed based upon a date in which each of the entries for the selected content feed is published or syndicated.

5. The method of claim 3, wherein the graph view displays a visual representation of the selected feed as a graph according to specified characteristics of the selected content feed.

6. The method of claim 1, further comprising
deploying process software for providing the content management services, said deploying comprising:
installing said process software on at least one server;
identifying server addresses for users accessing said process software on said at least one server;
installing a proxy server if needed;
sending said process software to said at least one server and copying said process software to a file system of said at least one server;
sending the process software to at least a first client computer; and
executing said process software on said first client computer.

7. The method of claim 6, wherein said installing said process software further comprises:
determining if programs will reside on said at least one server when said process software is executed;
identifying said at least one server that will execute said process software; and
transferring said process software to storage for said at least one server.

8. The method of claim 6, wherein said sending said process software to said first client computer further includes having said at least one server automatically copy said process software to said first client computer, and running an installation program at said first client computer to install said process software on said first client computer.

9. The method of claim 6, wherein said sending said process software to said first client computer further comprises identifying a user and an address of said first client computer.

10. The method of claim 6, wherein said sending said process software to said first client computer includes sending said process software to at least one directory on said first client computer.

11. The method of claim 1, further comprising integrating process software for providing the content management services, said integrating comprising:
determining if said process software will execute on at least one server;
identifying an address of said at least one server;
checking said at least one server for operating systems, applications, and version numbers for validation with said process software, and identifying any missing software applications for said at least one server that are required for integration;
updating said at least one server with respect to any operating system and application that is not validated for said process software, and providing any of said missing software applications for said at least one server required for said integration;
identifying client addresses and checking client computers for operating systems, applications, and version numbers for validation with said process software, and identifying any software applications missing from said client computers that are required for integration;
updating said client computers with respect to any operating system and application that is not validated for said process software, and providing any missing software application for said client computers required for said integration; and
installing said process software on said client computers and said at least one server.

12. The method of claim 1, further comprising on-demand sharing of process software for providing the content management services, said on demand sharing comprising:
creating a transaction containing unique customer identification, requested service type, and service parameters;
sending said transaction to at least one main server;
querying said at least one main server about processing capacity associated with said at least one main server to help ensure availability of adequate resources for processing of said transaction; and
allocating additional processing capacity when additional capacity appears needed to process said transaction, said additional processing capacity being selected from the group of additional capacities consisting of central processing unit capacity, processor memory capacity, network bandwidth capacity, and storage capacity.

13. The method of claim 1, further comprising deploying, accessing, and executing process software for providing the content management services, said deploying, accessing, and executing process software implemented through a virtual private network, the method further comprising:
determining if a virtual private network is required;
checking for remote access to said virtual private network when it is required;
if said remote access does not exist, identifying a third party provider to provide secure, encrypted connections between a private network and remote users;
identifying said remote users; and
setting up a network access server operable for downloading and installing client software on desktop computers for remote access of said virtual private network;
accessing said process software;

transporting said process software to at least one remote user's desktop computer; and executing said process software on said at least one remote user's desktop computer.

14. A system for providing web content management services, comprising:

a computer processor; and an application executing on the computer processor, the application providing a user interface to implement a method, comprising:

displaying a listing of content feeds within a user interface screen, each of the content feeds representing a list of content entries;

receiving preferences via the user interface, the preferences including:

a weighting factor representing a relevance of content sources identified for each of the content feeds in context with others of the content feeds in the listing; and a view type selected from a list of view types to each of the content feeds in the listing, each of the view types representing a manner in which information in the content feeds is displayed via the user interface;

applying the preferences to the content feeds, comprising:

for each of the content feeds, searching for content in a corresponding content feed using key words that have been assimilated with the view type selected; and displaying results of the applying the preferences via the user interface screen, the results representing a modified form of a selected content feed;

wherein the view types include a calendar view that displays at least one of:

events listed in the entries for a selected content feed according to corresponding calendar dates identified for the events in the selected content feed; and entries for the selected content feed populated in a location in the calendar view representative of corresponding dates in which the entries are published.

15. The system of claim 14, wherein the preferences are user-selected preferences; and wherein at least one of the preferences is determined according to suitability of a view type for a specified content feed.

16. The system of claim 14, wherein the view types include:

a full content view;

an abbreviated view;

a summary view;

a time view;

a grid view;

a thread view;

a graph view;

a statistical view; and a document revision view.

17. The system of claim 16, wherein the time view displays entries in a selected content feed based upon a date in which each of the entries for the selected content feed is published or syndicated.

18. The system of claim 16, wherein the graph view displays a visual representation of the selected feed as a graph according to specified characteristics of the selected content feed.

19. A computer program product including a non-transitory storage medium encoded with machine-readable computer program code for providing content management services, the program code comprising instructions for causing a computer to implement a method, the method comprising:

displaying a listing of content feeds within a user interface screen, each of the content feeds representing a list of content entries;

receiving preferences via a user interface, the preferences including:

a weighting factor representing a relevance of content sources identified for each of the content feeds in context with others of the content feeds in the listing;

a view type selected from a list of view types to each of the content feeds in the listing, each of the view types representing a manner in which information in the content feeds is displayed via the user interface;

applying the preferences to the content feeds, comprising:

for each of the content feeds, searching for content in a corresponding content feed using key words that have been assimilated with the view type selected; and displaying results of the preferences via the user interface screen, the results representing a modified form of a selected content feed;

wherein the view types include a calendar view that displays at least one of:

events listed in the entries for a selected content feed according to corresponding calendar dates identified for the events in the selected content feed; and entries for the selected content feed populated in a location in the calendar view representative of corresponding dates in which the entries are published.

20. The computer program product of claim 19, wherein the preferences are user-selected preferences; and wherein at least one of the preferences is determined according to suitability of a view type for a specified content feed.

21. The computer program product of claim 19, wherein the view types include:

a full content view;

an abbreviated view;

a summary view;

a time view;

a grid view;

a thread view;

a graph view;

a statistical view; and a document revision view.

22. The computer program product of claim 21, wherein the time view displays entries in a selected content feed based upon a date in which each of the entries for the selected content feed is published or syndicated.

* * * * *